United States Patent
Eto et al.

(10) Patent No.: US 12,438,610 B2
(45) Date of Patent: *Oct. 7, 2025

(54) DEVICE AND METHOD FOR ESTIMATING CHARACTERISTICS OF OPTICAL FIBER TRANSMISSION LINE

(71) Applicant: Fujitsu Limited, Kawasaki (JP)

(72) Inventors: Motohiko Eto, Kawasaki (JP); Kazuyuki Tajima, Yokosuka (JP); Setsuo Yoshida, Inagi (JP); Shoichiro Oda, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 191 days.

This patent is subject to a terminal disclaimer.

(21) Appl. No.: 18/177,197

(22) Filed: Mar. 2, 2023

(65) Prior Publication Data
US 2023/0396332 A1    Dec. 7, 2023

(30) Foreign Application Priority Data
Jun. 3, 2022 (JP) ................. 2022-090642

(51) Int. Cl.
H04B 10/25 (2013.01)
G01M 11/00 (2006.01)
H04B 10/071 (2013.01)

(52) U.S. Cl.
CPC ....... *H04B 10/071* (2013.01); *G01M 11/3127* (2013.01); *H04B 10/25* (2013.01)

(58) Field of Classification Search
CPC ................................................ H04B 10/25
See application file for complete search history.

(56) References Cited

U.S. PATENT DOCUMENTS

| 10,090,917 B2 | 10/2018 | Searcy et al. |
| 2009/0297154 A1 | 12/2009 | Izumi |

(Continued)

FOREIGN PATENT DOCUMENTS

| JP | 2018-133725 A | 8/2018 |
| JP | 2018-152744 | 9/2018 |

(Continued)

OTHER PUBLICATIONS

L. S. Schanner, J. H. Da Cruz Júnior, T. Sutili and R. C. Figueiredo, "Power Profile Estimation of Optical Transmission Links Based on Machine Learning," in IEEE Photonics Technology Letters, vol. 33, No. 19, pp. 1089-1092, 1 Oct. 1, 2021, doi: 10.1109/LPT.2021.3104508. (Year: 2021).*

(Continued)

Primary Examiner — Nathan M Cors
(74) Attorney, Agent, or Firm — STAAS & HALSEY LLP

(57) ABSTRACT

A characteristics estimation device estimates characteristics of an optical fiber transmission line in an optical transmission system in which an optical signal is transmitted from first node to second node via the optical fiber transmission line. The characteristics estimation device includes a processor. The processor generates, based on electric field information indicating an electric field of the optical signal received by the second node via the optical fiber transmission line, a power profile indicating a relationship between power of the optical signal and dispersion amount corresponding to a transmission distance from the first node or the second node. The processor detects a span forming the optical fiber transmission line by using the power profile. The processor calculates, for the detected span, a dispersion coefficient of the optical fiber transmission line by dividing (Continued)

the dispersion amount estimated based on the power profile by a corresponding span length.

11 Claims, 31 Drawing Sheets

(56) References Cited

U.S. PATENT DOCUMENTS

| | | | |
|---|---|---|---|
| 2018/0013490 A1* | 1/2018 | Searcy | H04J 14/02 |
| 2018/0234184 A1 | 8/2018 | Tanimura et al. | |
| 2019/0334616 A1* | 10/2019 | Zhong | H04B 10/07 |
| 2020/0036440 A1 | 1/2020 | Yamagishi et al. | |
| 2021/0306073 A1 | 9/2021 | Yoshida et al. | |
| 2022/0149938 A1* | 5/2022 | Pei | H04B 10/07951 |
| 2022/0416890 A1 | 12/2022 | Sasai et al. | |
| 2023/0101519 A1* | 3/2023 | Jiang | H04B 10/07953 |
| | | | 398/27 |
| 2023/0393021 A1 | 12/2023 | Tajima et al. | |

FOREIGN PATENT DOCUMENTS

| | | |
|---|---|---|
| JP | 2019-041285 | 3/2019 |
| JP | 2021-158582 A | 10/2021 |
| WO | 2021124415 A1 | 6/2021 |

OTHER PUBLICATIONS

U.S. Non-Final Office Action dated Mar. 12, 2025 issued in copending U.S. Appl. No. 18/326,091.
U.S. Appl. No. 18/326,091, filed May 31, 2023, Kazuyuki Tajima, Fujitsu Limited.

* cited by examiner

Related Art

| SPAN | DISPERSION AMOUNT (ps/nm) | | SPAN LENGTH (km) | DISPERSION COEFFICIENT (ps/nm/km) |
| --- | --- | --- | --- | --- |
| | DESIGN VALUE | ESTIMATE | | |
| SP1 | 990 | 980 | 60 | 16.3 |
| SP2 | 1320 | 360 | 80 | 4.5 |
| SP3 | 660 | 680 | 40 | 17 |

| FIBER TYPE | DISPERSION COEFFICIENT (ps/nm/km) |
|---|---|
| SMF | 14~17 |
| NZ-DSF | 3~7 |
| DSF | -2~2 |

FIG. 15B

| SPAN | DISPERSION AMOUNT (ps/nm) | | SPAN LENGTH (km) | DISPERSION COEFFICIENT (ps/nm/km) | FIBER TYPE | DETERMINATION |
|---|---|---|---|---|---|---|
| | DESIGN VALUE | ESTIMATE | | | | |
| SP1 | 990 | 980 | 60 | 16.3 | SMF | OK |
| SP2 | 1320 | 360 | 80 | 4.5 | NZ-DSF | NG |
| SP3 | 660 | 680 | 40 | 17 | SMF | OK |

| FIBER1 | FIBER2 | X VALUE | CALCULATED CONNECTION POSITION | CONNECTION POSITION BASED ON DESIGN INFORMATION | DETERMINATION |
|---|---|---|---|---|---|
| SMF | SMF | — | — | 30 km | NG |
| SMF | NZ-DSF | 0.5 | 30 km | 30 km | OK |
| SMF | DSF | 0.63 | 38 km | 30 km | NG |
| SMF | LS | 0.66 | 40 km | 30 km | NG |

FIG. 19

| WAVELENGTH (nm) | DISPERSION AMOUNT (ps/nm) | SPAN LENGTH (km) | DISPERSION COEFFICIENT (ps/nm/km) | FIBER TYPE |
|---|---|---|---|---|
| 1542 | 240 | 60 | 4.0 | NZ-DSF |
| 1552 | 270 | 60 | 4.5 | NZ-DSF |
| 1562 | 300 | 60 | 5.0 | NZ-DSF |

DEVICE AND METHOD FOR ESTIMATING CHARACTERISTICS OF OPTICAL FIBER TRANSMISSION LINE

CROSS-REFERENCE TO RELATED APPLICATION

This application is based upon and claims the benefit of priority of the prior Japanese Patent Application No. 2022-090642, filed on Jun. 3, 2022, the entire contents of which are incorporated herein by reference.

FIELD

The embodiments discussed herein are related to a device and a method for estimating characteristics of an optical fiber transmission line.

BACKGROUND

Optical fiber types to be used in an optical communication network are determined according to, for example, the purpose of use or cost. In recent years, single-mode fibers (SMFs), dispersion-shifted single-mode fibers (DSFs), non-zero dispersion-shifted single-mode fibers (NZ-DSFs), or the like have been used in optical communication networks. Types of NZ-DSFs include LEAF (Registered Trademark) and True Wave RS (TWRS) (Registered Trademark).

An SMF is an optical fiber having a small core diameter such that light propagates in only one mode. General-purpose SMFs have a zero-dispersion wavelength in the 1310-nm band and thus provide a small transmission loss. Hence, general-purpose SMFs are often used in trunk networks, which are required to allow for high-quality and stable communication. DSFs have a zero-dispersion wavelength in the 1550-nm band, in which a small transmission loss is made, and are thus often used for long-distance transmissions. The zero-dispersion wavelength of NZ-DSFs is slightly shifted from the 1550-nm band. As an example, a NZ-DSF may have a zero-dispersion wavelength at about 1500 nm. Thus, the nonlinear effect in the 1550-nm band is suppressed, so NZ-DSFs are preferable for wavelength-division-multiplexing transmissions and often used for ultra-fast long-distance transmissions.

An optical transceiver and an optical amplifier implemented in each optical node in an optical transmission system need to be designed according to the type of an optical fiber. Thus, communication carriers check the type of an optical fiber installed in each span. Note that the type of an optical fiber may hereinafter be simply referred to as a "fiber type."

FIGS. 1A-1D illustrate an example of a method for estimating a fiber type. In this example, the type of an optical fiber 503 installed between nodes 501 and 502 depicted in FIG. 1A is estimated. In this case, a multi-wavelength optical time domain reflectometer (OTDR) 504 is connected to one of the nodes. In this example, the OTDR causes optical pulses to enter the optical fiber and detects reflection light from the optical fiber. Then, the propagation time of the optical pulses is measured based on a timing at which the reflection light is received, so as to detect the distance to a discontinuous point or an end point of the optical fiber.

The multi-wavelength OTDR 504 measures characteristics of the optical fiber 503 by using a plurality of wavelengths (λ1-λ4). In this regard, the propagation velocity of light through the optical fiber is dependent on wavelength. Thus, as indicated in FIG. 1B, the propagation time of optical pulses measured by the multi-wavelength OTDR 504 is dependent on wavelength. Hence, by plotting measurement results with respect to wavelength, the dispersion coefficient of the optical fiber for which measurement is performed can be calculated as indicated in FIGS. 1C and 1D. The fiber type can be estimated based on the dispersion coefficient.

Proposed methods are ones wherein the states of s spans of a transmission line are monitored (e.g., Japanese Laid-open Patent Publication No. 2018-133725). Other proposed methods are ones wherein characteristics of a transmission line are estimated based on, for example, a dispersion coefficient used to compensate for chromatic dispersion of a received optical signal (e.g., International Publication Pamphlet No. WO 2021/124415).

Methods for estimating characteristics of an optical transmission line in order to estimate a fiber type are known as indicated above. However, in conventional methods (e.g., method illustrated in FIGS. 1A-1D), transmission characteristics are estimated using a multi-wavelength OTDR. However, multi-wavelength OTDRs are expensive and thus require a high cost to estimate transmission characteristics. Moreover, when estimating transmission characteristics by using a multi-wavelength OTDR, a fiber end needs to be open or a reflector needs to be connected to the fiber end, thereby leading to a large workload.

SUMMARY

According to an aspect of the embodiments, a characteristics estimation device estimates characteristics of an optical fiber transmission line in an optical transmission system in which an optical signal is transmitted from a first node to a second node via the optical fiber transmission line. The characteristics estimation device includes a processor. The processor generates, based on an electric field information signal indicating an electric field of the optical signal received by the second node via the optical fiber transmission line, a power profile indicating a relationship between power of the optical signal and a dispersion amount corresponding to a transmission distance from the first node or the second node. The processor detects one or more spans forming the optical fiber transmission line by using the power profile. The processor calculates, for each detected span, a dispersion coefficient of the optical fiber transmission line by dividing a dispersion amount estimated based on the power profile by a corresponding span length.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates results of estimation of dispersion amounts and dispersion coefficients of spans;

FIG. 15A illustrates an example of fiber data;

FIG. 15B illustrates an example of results of determination of fiber types;

FIG. 19 illustrates results of processing and determination in accordance with the third embodiment;

DESCRIPTION OF EMBODIMENTS

A transmission characteristics estimation device in accordance with embodiments of the present invention has a function for measuring optical power for an arbitrary position on an optical fiber transmission line based on a received optical signal. Descriptions are given of the function for measuring the power of an optical signal at an arbitrary position on an optical fiber transmission line, before descriptions are given of the function for estimating a fiber type.

Figure 1A:
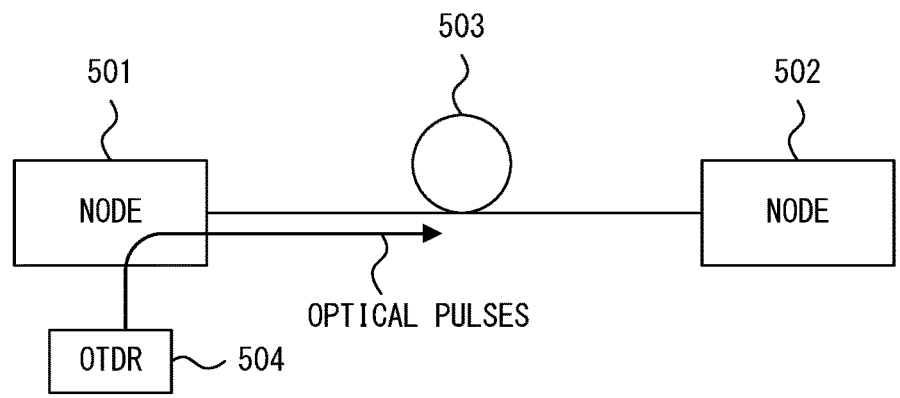
FIGS. 1A-1D illustrate an example of a method for estimating a fiber type.
Figure 1B:
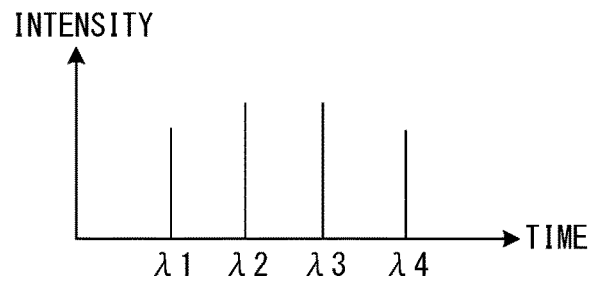
Figure 1C:
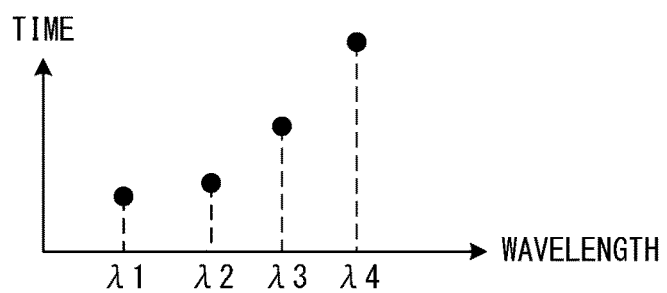
Figure 1D:
Figure 2:
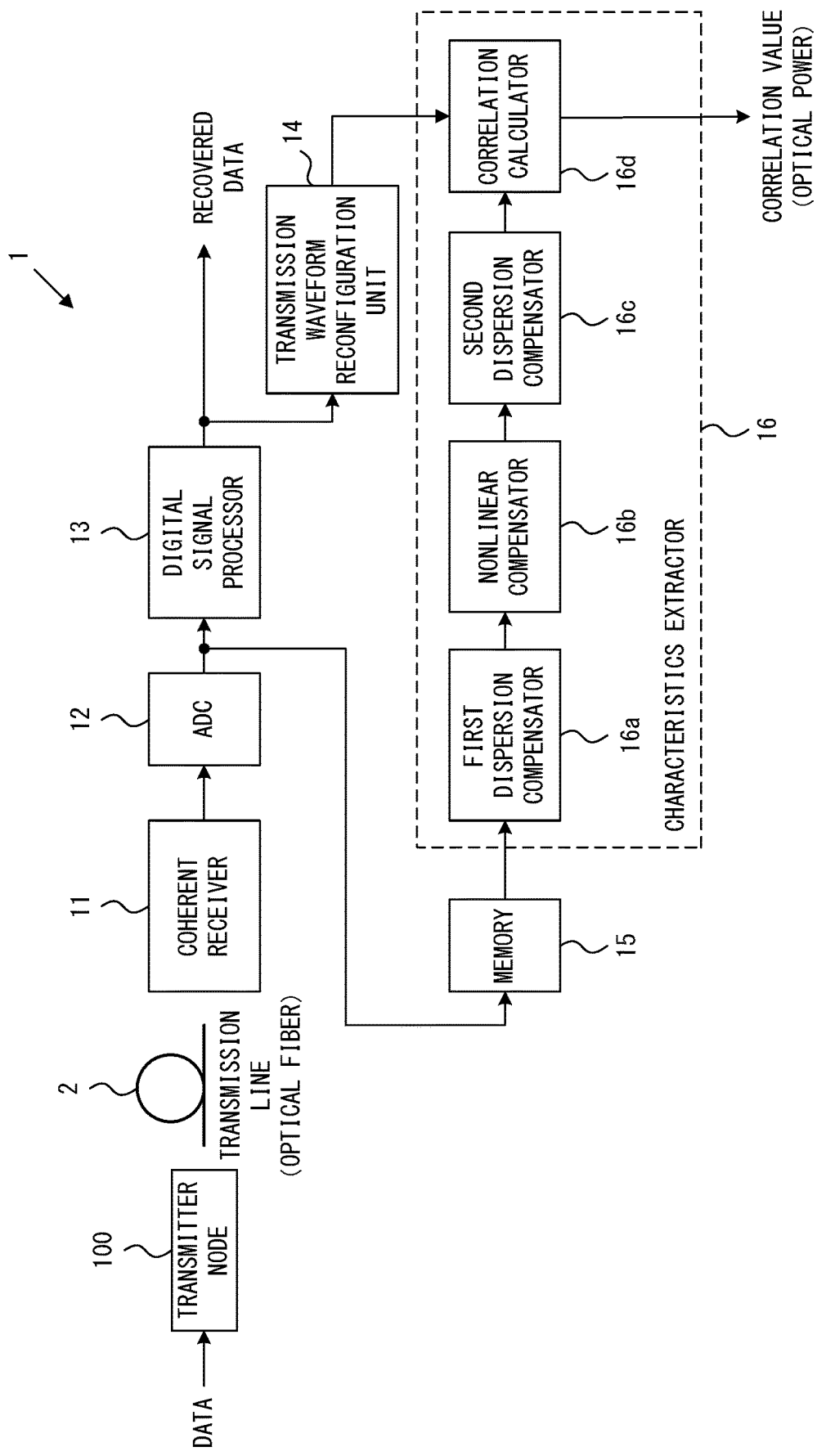
FIG. 2 illustrates an example of a method for measuring the power of an optical signal at an arbitrary position on an optical transmission line.

FIG. 2 illustrates an example of a method for measuring the power of an optical signal at an arbitrary position on an optical transmission line. In this example, an optical signal is transmitted from a transmitter node 100 through an optical fiber transmission line 2. An optical transmission device 1 receives the optical signal via the optical fiber transmission line 2.

The optical transmission device 1 includes a coherent receiver 11, an analog-to-digital converter (ADC) 12, a digital signal processor 13, a transmission waveform reconfiguration unit 14, a memory circuit 15, and a characteristics extractor 16. The optical transmission device 1 may include other functions or circuits that are not depicted in FIG. 1.

The coherent receiver 11 includes a 90-degree optical hybrid circuit and generates an electric field information signal (or electrical-field data) indicating the electric field of a received optical signal. The electric field information signal includes an in-phase (I) component and a quadrature (Q) component of the received optical signal. When the optical signal is a polarization multiplexed optical signal, the electric field information signal includes an I component and a Q component of a H polarization and an I component and a Q component of a V polarization. The ADC 12 converts the electric field information signal into a digital signal.

Figure 3:
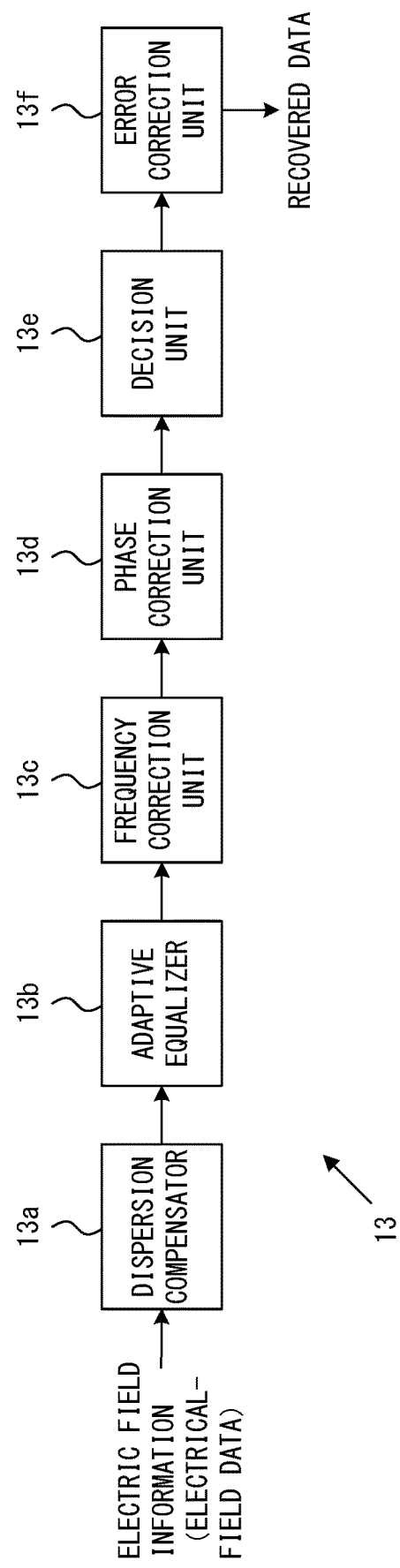
FIG. 3 illustrates an example of the function of a digital signal processor.

FIG. 3 illustrates an example of the function of the digital signal processor 13. As depicted in FIG. 3, the digital signal processor 13 includes a dispersion compensator 13a, an adaptive equalizer 13b, a frequency correction unit 13c, a phase correction unit 13d, a decision unit 13e, and an error correction unit 13f. The digital signal processor 13 processes electric field information of a received optical signal.

The dispersion compensator 13a is a fixed equalizer and compensates for chromatic dispersion of an optical transmission line. The adaptive equalizer 13b adaptively performs equalization. For example, the adaptive equalizer 13b can compensate for residual dispersion. The adaptive equalizer 13b has a function for separating a received optical signal into polarizations when the received optical signal is a polarization multiplexed optical signal. The frequency correction unit 13c compensates for a frequency offset between a light source of the transmitter node 100 and a local light source provided at the optical transmission device 1. The phase correction unit 13d compensates for a phase offset between the transmitter node 100 and the optical transmission device 1 and estimates the phase of an optical signal transmitted from the transmitter node 100. Thus, for each symbol, a signal point on a constellation is recovered. The decision unit 13e recovers transmission data based on constellation information (a phase and an amplitude) output from the phase correction unit 13d. The error correction unit 13f corrects an error in the recovered data.

The transmission waveform reconfiguration unit 14 generates an electric field information signal by mapping transmission data recovered by the digital signal processor 13 onto a constellation. This mapping is substantially the same as the mapping performed by the transmitter node 100. Thus, the electric field information signal generated by the transmission waveform reconfiguration unit 14 is substantially the same as an electric field information signal for generating an optical signal in the transmitter node 100. Accordingly, an output signal of the transmission waveform reconfiguration unit 14 indicates the electric field of the optical signal in the transmitter node 100. Note that an output signal of the transmission waveform reconfiguration unit 14 (i.e., an electric field information signal for generating an optical signal in the transmitter node 100) may hereinafter be referred to as a "reference signal."

The memory circuit 15 stores an electric field information signal indicating the electric field of a received optical signal. In FIG. 2, an input signal of the digital signal processor 13 is stored in the memory circuit 15 as a reception electric field information signal. However, embodiments of the present invention are not limited to this configuration. For example, an output signal of the dispersion compensator 13a, the adaptive equalizer 13b, the frequency correction unit 13c, or the phase correction unit 13d may be stored in the memory circuit 15 as a reception electric field information signal.

The characteristics extractor 16 includes a first dispersion compensator 16a, a nonlinear compensator 16b, a second dispersion compensator 16c, and a correlation calculator 16d and compensates for chromatic dispersion and nonlinear distortion in an electric field information signal indicating the electric field of a received optical signal. The first dispersion compensator 16a compensates for a portion of a chromatic dispersion (hereinafter, a "first chromatic dispersion") of the optical transmission line in the electric field information signal. The nonlinear compensator 16b compensates for a nonlinear distortion of the optical transmission line in an output signal of the first dispersion compensator 16a. The second dispersion compensator 16c compensates for the remaining chromatic dispersion (hereinafter, a "second chromatic dispersion) of the optical transmission line in an output signal of the nonlinear compensator 16b. The correlation calculator 16d calculates a correlation between an output signal of the second dispersion compensator 16c and an output signal of the transmission waveform reconfiguration unit 14. As described above, the output signal of the transmission waveform reconfiguration unit 14 indicates the electric field of the optical signal in the transmitter node 100. Accordingly, the correlation calculator 16d calculates a correlation between the electric field information signal in which the chromatic dispersion and the nonlinear distortion have been compensated for and the electric field information signal indicating the electric field of the optical signal in the transmitter node 100. It is preferable that the output signal of each of the second dispersion compensator 16c and the transmission waveform reconfiguration unit 14 be appropriately normalized.

A correlation value calculated by the characteristics extractor 16 indicates the power of an optical signal transmitted through the optical transmission line as described below. Accordingly, the optical transmission device 1 can measure the power of the optical signal transmitted through the optical transmission line by calculating the correlation value. The following describes a relationship between the correlation value and the power of the optical signal by referring to FIG. 4.

Figure 4:
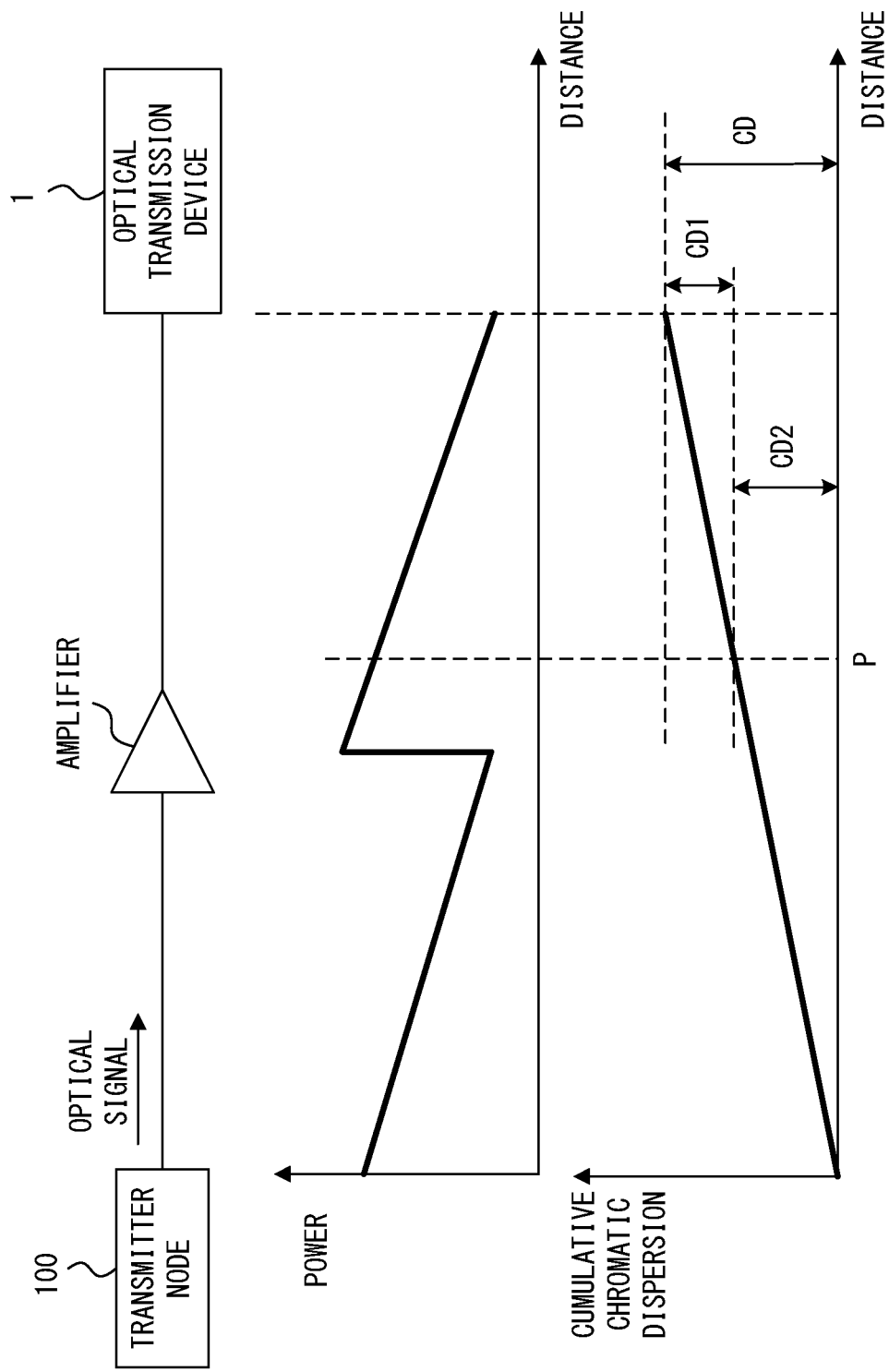
FIG. 4 illustrates an example of changes in the power of an optical signal and in chromatic dispersion of the optical signal.

FIG. 4 illustrates an example of changes in the power of an optical signal and in chromatic dispersion in the optical signal. In this example, an optical signal is transmitted from the transmitter node 100 to the optical transmission device 1. An optical amplifier is provided on the optical transmission line.

The power of the optical signal decreases as the distance from the transmitter node 100 increases. The optical signal is amplified by the optical amplifier. Afterward, the power of the optical signal decreases as the distance from the optical amplifier increases. Cumulative chromatic dispersions added to the optical signal increase in proportion to the distance from the transmitter node 100. Note that the "CD" indicated in FIG. 4 represents the total chromatic dispersion of the optical transmission line between the transmitter node 100 and the optical transmission device 1.

In this example, the optical transmission device 1 measures the power of the optical signal at a position P depicted in FIG. 4. Note that the chromatic dispersion of the optical transmission line between the optical transmission device 1 and the position P is CD1. The chromatic dispersion between the transmitter node 100 and the position P is CD2. The sum of CD1 and CD2 is CD.

As described above, the characteristics extractor 16 compensates for chromatic dispersion and nonlinear distortion. In particular, the first dispersion compensator 16a compensates for the chromatic dispersion CD1 in an electric field information signal indicating the received optical signal. The nonlinear compensator 16b compensates for the nonlinear distortion in an output signal of the first dispersion compensator 16a. In this case, the nonlinear compensator 16b compensates for nonlinear distortion of specified amount. The second dispersion compensator 16c compensates for the chromatic dispersion CD2 in an output signal of the nonlinear compensator 16b.

The magnitude of nonlinear distortion that occurs on the optical transmission line is dependent on the power of an optical signal. In particular, the nonlinear distortion increases as the power of the optical signal becomes larger. In this example, the nonlinear compensator 16b is designed to compensate for a nonlinear distortion that occurs when the power of an optical signal is sufficiently large. For example, the nonlinear compensator 16b may be designed to compensate for a nonlinear distortion that occurs an optical power of the optical signal is equal to an output optical power of the transmitter node 100.

Meanwhile, the correlation value calculated by the correlation calculator 16d indicates the correlation between the electric field information signal in which the chromatic dispersion and the nonlinear distortion have been compensated for in the characteristics extractor 16 and the electric field information signal indicating the electric field of the optical signal in the transmitter node 100. Thus, a correlation value calculated by the correlation calculator 16d will be large when the nonlinear compensator 16b appropriately compensates for nonlinear distortion.

Specifically, when the power of the optical signal at the position P is large, the amount of nonlinear distortion at the position P will be large, and the difference between the amount of nonlinear distortion at the position P and the amount of nonlinear distortion to be compensated for by the nonlinear compensator 16b will be small. As a result, the nonlinear compensator 16b appropriately compensates for the nonlinear distortion, and the difference between the output signal of the second dispersion compensator 16c and the electric field information signal in the transmitter node 100 is small, so the correlation calculator 16d obtains a large correlation value. When the power of the optical signal at the position P is small, the amount of nonlinear distortion at the position P will be small, and the difference between the amount of nonlinear distortion at the position P and the amount of nonlinear distortion to be compensated for by the nonlinear compensator 16b will be large. As a result, the nonlinear compensator 16b does not appropriately compensate for the nonlinear distortion, and the difference between the output signal of the second dispersion compensator 16c and the electric field information signal in the transmitter node 100 is large, so the correlation calculator 16d obtains a small correlation value. In other words, the correlation value is large when the power of the optical signal at the position P is large, and the correlation value is small when the power of the optical signal at the position P is small. Thus, the correlation value calculated in the characteristics extractor 16 substantially indicates the power of an optical signal at a specified position on the optical transmission line (position P in FIG. 4).

The position P indicated in FIG. 4 is specified by a combination of the chromatic dispersion CD1 and the chromatic dispersion CD2. Thus, for the electric field information signal indicating the electric field of the received optical signal, the characteristics extractor 16 can measure the power of the optical signal at a desired position on the optical transmission line by changing the combination of the chromatic dispersion CD1 and the chromatic dispersion CD2.

Figure 5:
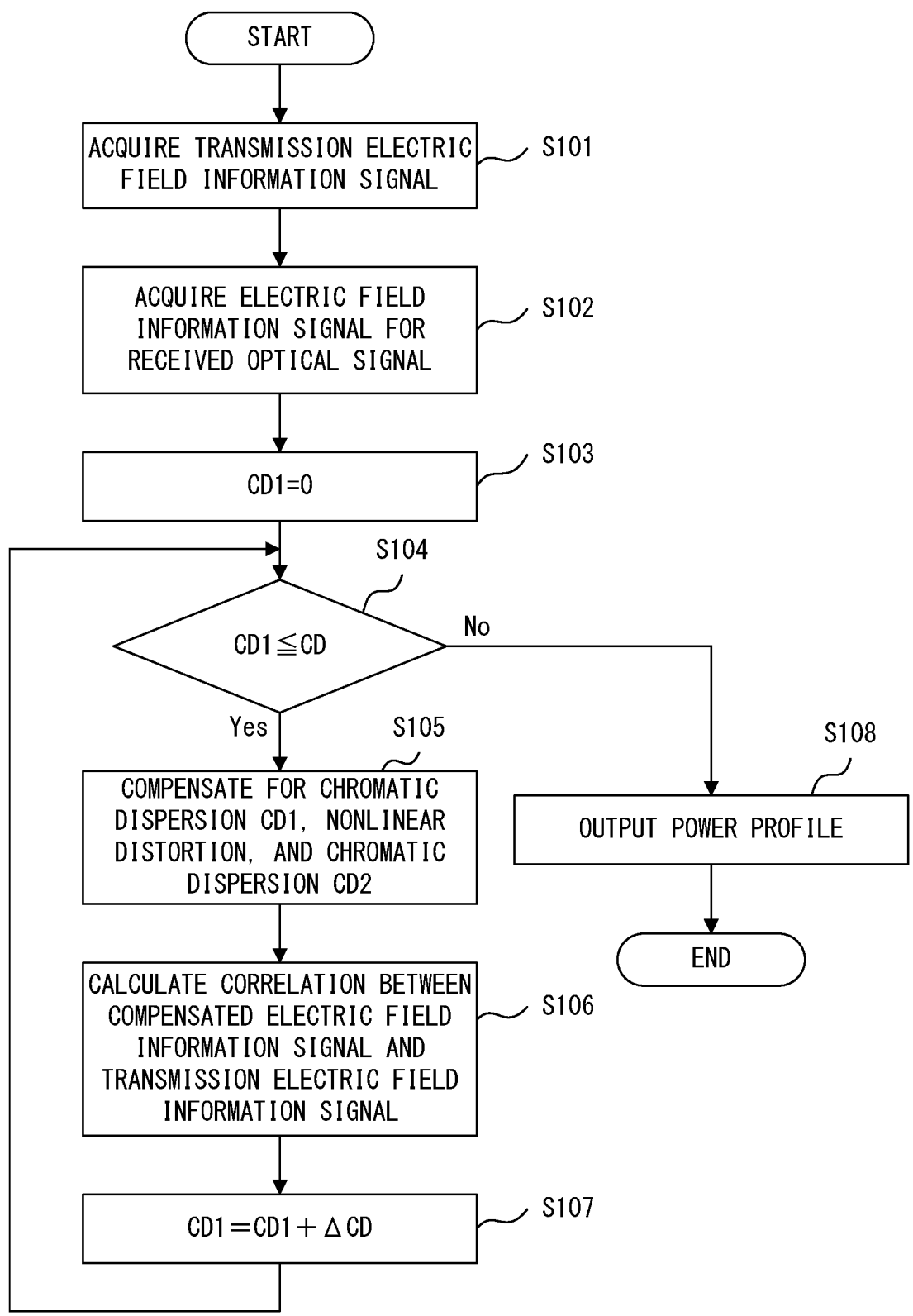
FIG. 5 is a flowchart illustrating an example of a process of measuring the power of an optical signal at a plurality of positions on an optical transmission line.

FIG. 5 is a flowchart illustrating an example of a process of measuring the power of an optical signal at a plurality of positions on an optical transmission line. This process is performed when the optical transmission device 1 receives, via the optical transmission line, an optical signal transmitted from the transmitter node 100.

In S101, the characteristics extractor 16 acquires a transmission electric field information signal generated by the transmission waveform reconfiguration unit 14. The transmission electric field information signal indicates the electric field of an optical signal in the transmitter node 100. In S102, the characteristics extractor 16 acquires the electric field information signal for the received optical signal. This electric field information signal is generated by the coherent receiver 11 or the digital signal processor 13 and stored in the memory circuit 15.

In S103, the characteristics extractor 16 initializes the chromatic dispersion CD1 to "zero." The value of chromatic dispersion CD1 corresponds to a transmission distance from the optical transmission device 1. The chromatic dispersion CD2 is calculated according to "CD1+CD2=CD." CD represents the total chromatic dispersion of the transmission line between the transmitter node 100 and the optical transmission device 1 and is a known value. In S104, the characteristics extractor 16 decides whether the chromatic dispersion CD1 is less than or equal to CD. When the chromatic dispersion CD1 is less than or equal to CD, the process of the characteristics extractor 16 shifts to S105.

In S105, for the electric field information signal for the received optical signal, the characteristics extractor 16 sequentially performs compensation of the chromatic dispersion CD1, nonlinear compensation, and compensation of the chromatic dispersion CD2. In S106, the characteristics extractor 16 calculates a correlation between the electric field information signal compensated in S105 and the transmission electric field information signal acquired in S101.

In S107, the characteristics extractor 16 increases the chromatic dispersion CD1 by ΔCD. Preferably, ΔCD is sufficiently small with respect to the total chromatic dispersion CD. Subsequently, the process of the characteristics extractor 16 returns to S104. In particular, the characteristics extractor 16 calculates correlation values by repeatedly performing S104-S107 until the chromatic dispersion CD1 becomes larger than CD, while increasing the chromatic dispersion CD1 by ΔCD in each of the repetitions. In this example, the value of chromatic dispersion CD1 corresponds to the transmission distance from the optical transmission device 1. Thus, the process of increasing the chromatic dispersion CD1 by ΔCD is equivalent to a process of shifting a position on the optical transmission line by a distance that corresponds to ΔCD. Accordingly, the characteristics extractor 16 can obtain correlation values for a plurality of positions on the optical transmission line by repeatedly performing the processes of S104-S107.

When the chromatic dispersion CD1 becomes larger than CD, the characteristics extractor 16 outputs, in S108, the correlation values calculated in S104-S107. The correlation values substantially indicate the powers of the optical signal at specified positions on the optical transmission line, which correspond to combinations of the chromatic dispersions CD1 and CD2. Accordingly, the characteristics extractor 16 can detect the powers of the optical signal at a plurality of positions on the optical transmission line. Note that information indicating the powers of an optical signal at a plurality of positions on an optical transmission line may hereinafter be referred to as a "power profile." As described above, the optical transmission device 1 can measure the power of an optical signal at a desired position on the optical transmission line and generate a power profile for the optical transmission line.

Figure 6:
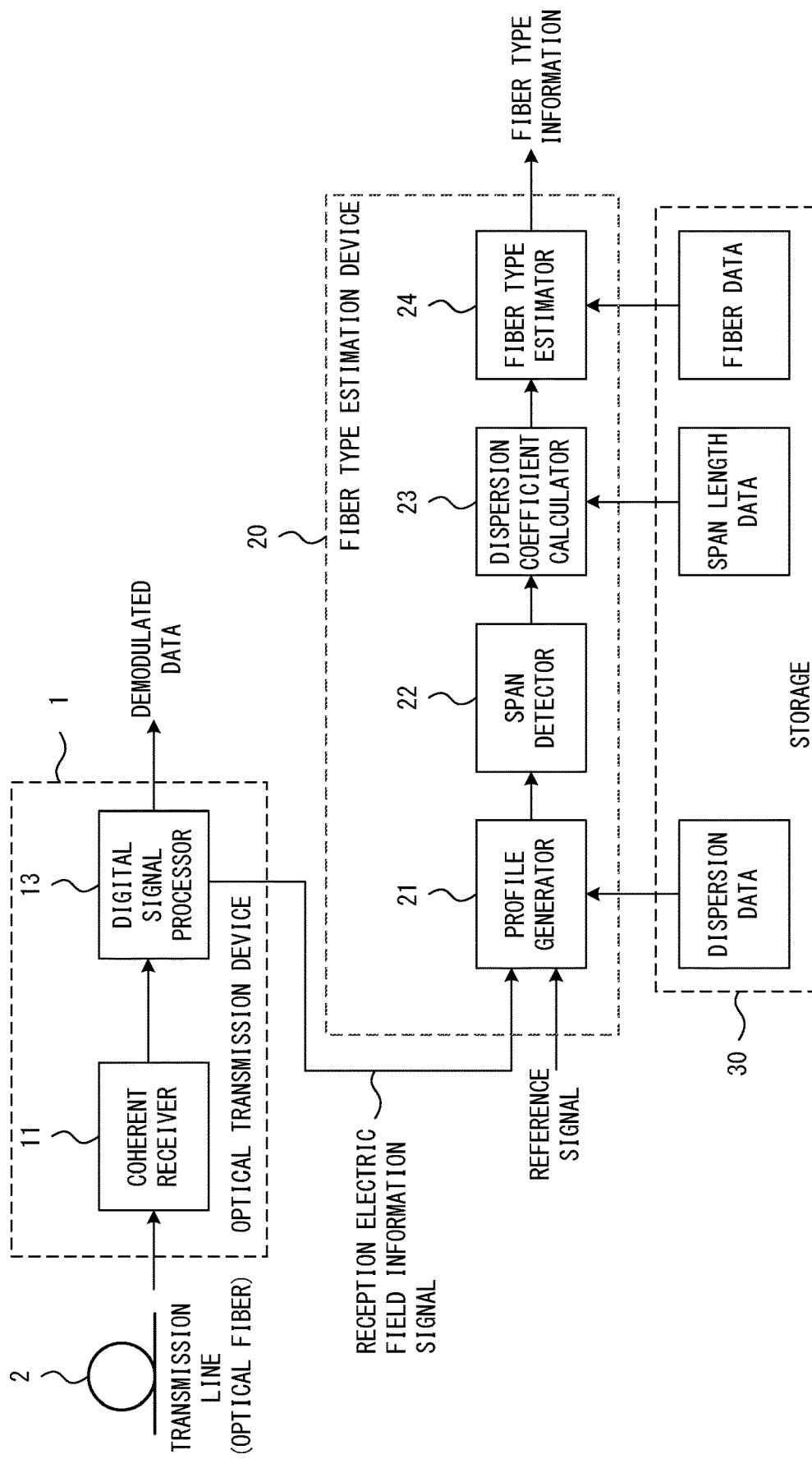
FIG. 6 illustrates an example of a fiber type estimation device in accordance with embodiments of the present invention.

FIG. 6 illustrates an example of a fiber type estimation device in accordance with embodiments of the present invention. In this example, a fiber type estimation device 20 in accordance with embodiments of the present invention is connected to the optical transmission device 1. The optical transmission device 1 includes the coherent receiver 11 and the digital signal processor 13. The coherent receiver 11 generates a reception electric field information signal (or electrical-field data) indicating the electric field of a received optical signal. As described above by referring to FIG. 3, the digital signal processor 13 recovers data based on the reception electric field information signal.

The fiber type estimation device 20 includes a profile generator 21, a span detector 22, a dispersion coefficient calculator 23, and a fiber type estimator 24. The fiber type estimation device 20 may have other functions that are not depicted in FIG. 6.

The fiber type estimation device 20 is implemented by a digital signal processor that processes a digital signal. The digital signal processor is implemented by a field programmable gate array (FPGA), a large scale integrated circuit (LSI), or a central processing unit (CPU). When the fiber type estimation device 20 is implemented by a CPU, the CPU provides the functions of the fiber type estimation device 20 by executing a software program.

Figure 7:
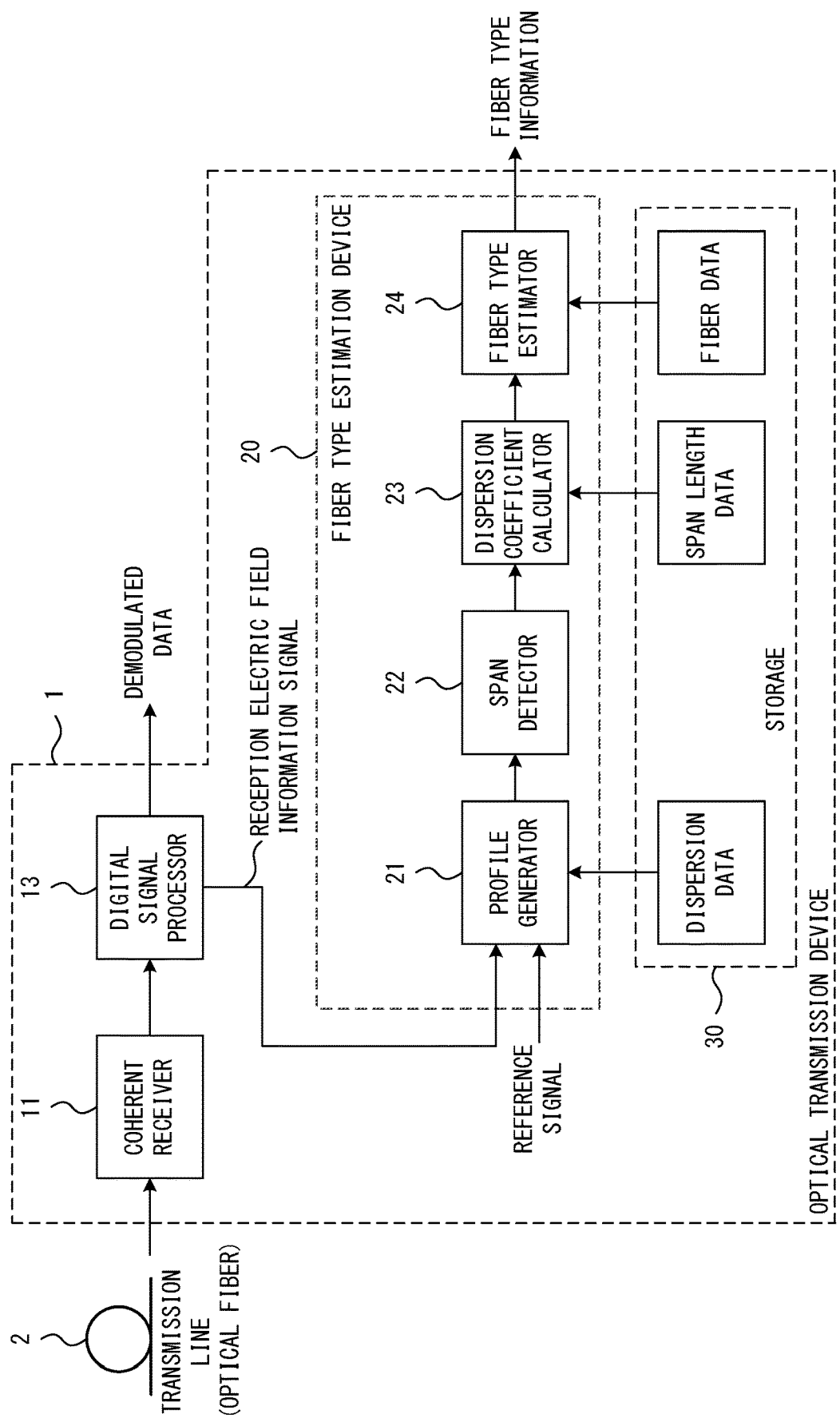
FIG. 7 illustrates another example of the fiber type estimation device in accordance with embodiments of the present invention.

FIG. 7 illustrates another example of the fiber type estimation device in accordance with embodiments of the present invention. In the example depicted in FIG. 6, the fiber type estimation device 20 is provided outside the optical transmission device 1. By contrast, in the example depicted in FIG. 7, the fiber type estimation device 20 is provided inside the optical transmission device 1. Note that the configuration of the fiber type estimation device 20 in FIG. 7 is substantially the same as that in FIG. 6.

Figure 8:
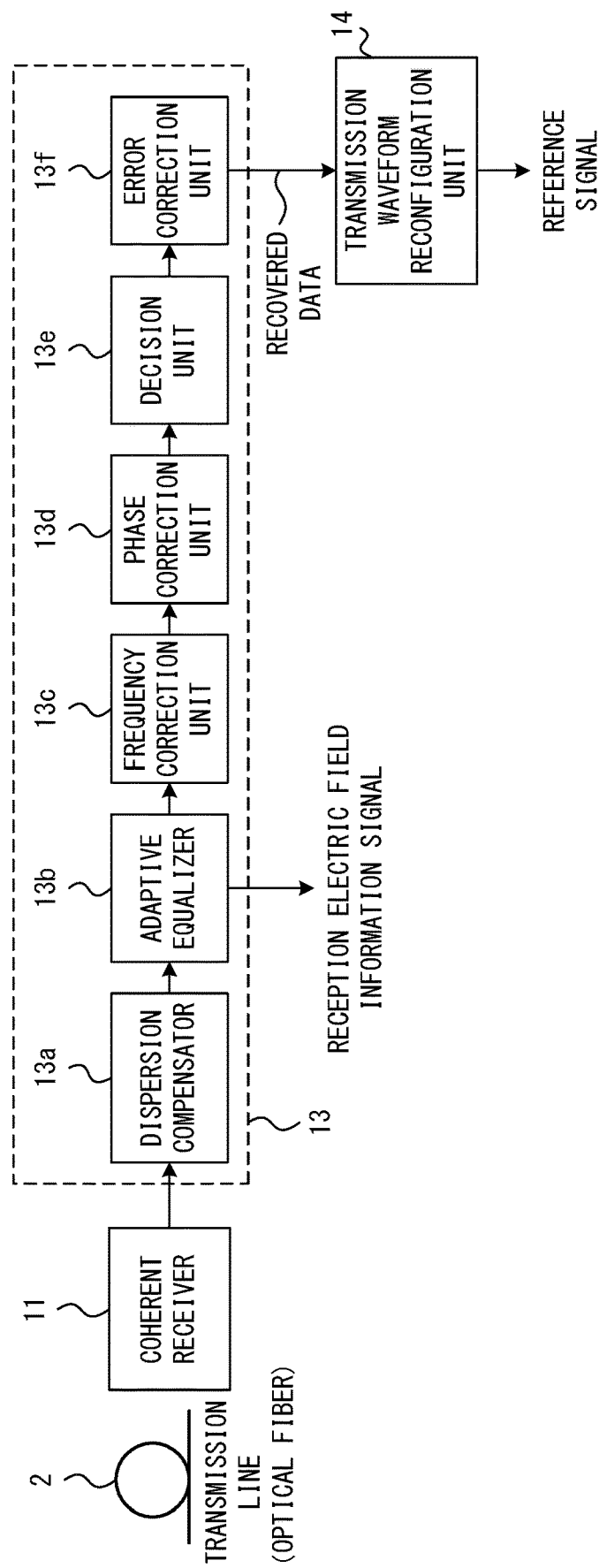
FIG. 8 illustrates an example of a method for generating a reception electric field information signal and a reference signal.

By using a reception electric field information signal and a reference signal, the fiber type estimation device 20 estimates the type of an optical fiber connecting the transmitter node 100 and the optical transmission device 1. The reception electric field information signal indicates the electric field information of an optical signal received by the optical transmission device 1 from the transmitter node 100. As an example, an output signal of the adaptive equalizer 13b may be used, as depicted in FIG. 8, as the reception electric field information signal, but the invention is not particularly limited to this configuration. Alternatively, an output signal of the phase correction unit 13d may be used as the reception electric field information signal. The reference signal indicates electric field information for generating an optical signal in the transmitter node 100. In this example, the reference signal is generated by the transmission waveform reconfiguration unit 14 based on data recovered by the digital signal processor 13.

When estimating a fiber type, the fiber type estimation device 20 may refer to dispersion data, span length data, and fiber data. As depicted in FIGS. 6 and 7, the dispersion data, the span length data, and the fiber data are stored in a storage 30. For example, the storage 30 may be implemented by a semiconductor memory. Alternatively, the storage 30 may be implemented using a hardware circuit.

The dispersion data indicates the total amount of chromatic dispersion of the optical fiber transmission line 2 between the transmitter node 100 and the optical transmission device 1. For example, the total amount of chromatic dispersion of the optical fiber transmission line 2 may be measured in advance. The span length data indicates the length (or transmission distance) of each span. In this example, a span means the section between one optical node and another optical node adjacent to the one optical node. Optical nodes include a transmitter node, one or a plurality of relay stations, and a receiver node. The fiber data indicates a dispersion coefficient for each fiber type. For example, the fiber data may indicate the dispersion coefficients of an SMF, a DSF, and a NZ-DSF.

Based on a reception electric field information signal indicating the electric field of an optical signal received by the optical transmission device 1, the profile generator 21 generates a power profile for the dispersion amount corresponding to the transmission distance from the transmitter node 100 or the optical transmission device 1. In this case, the profile generator 21 generates the power profile in accordance with the flowchart illustrated in FIG. 5.

Figure 9A:
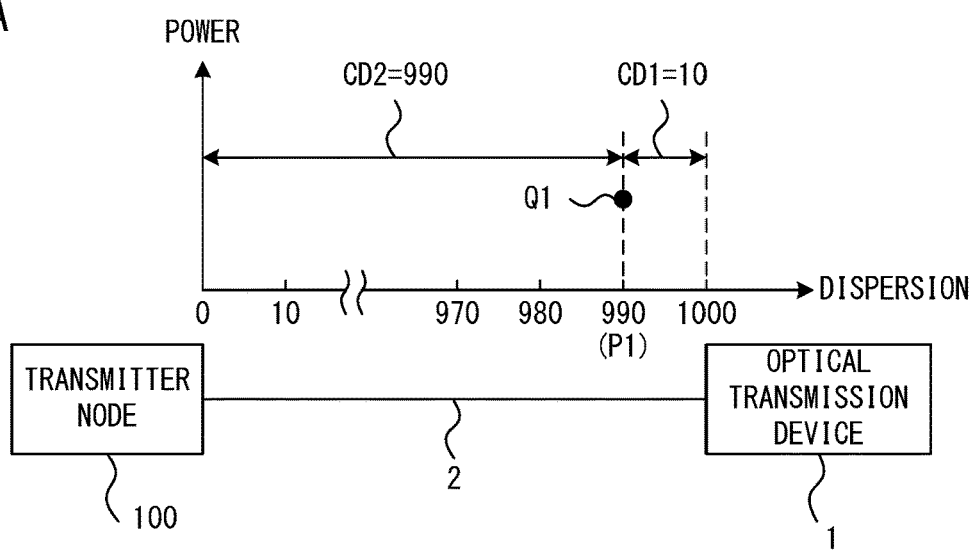
FIGS. 9A-9C illustrate an example of a method for generating a power profile.
Figure 9B:
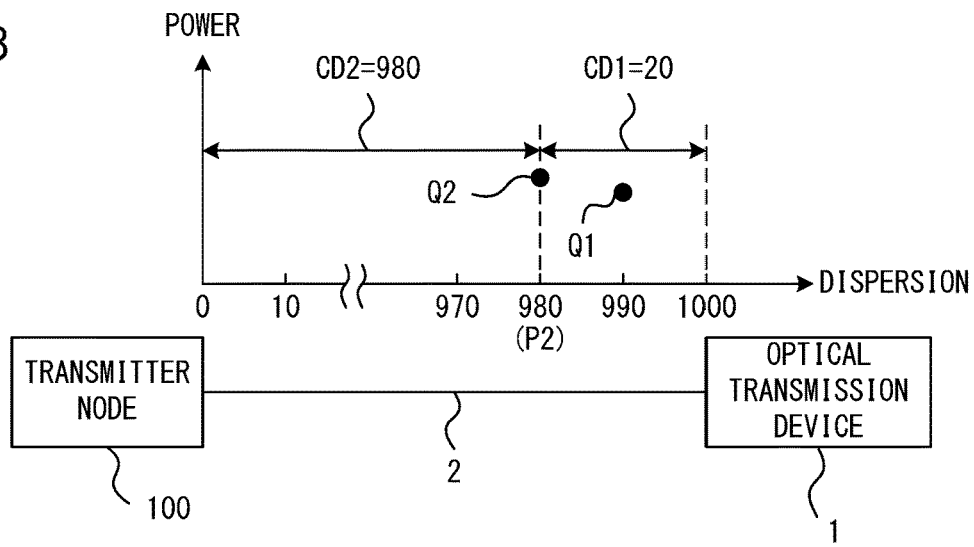
Figure 9C:
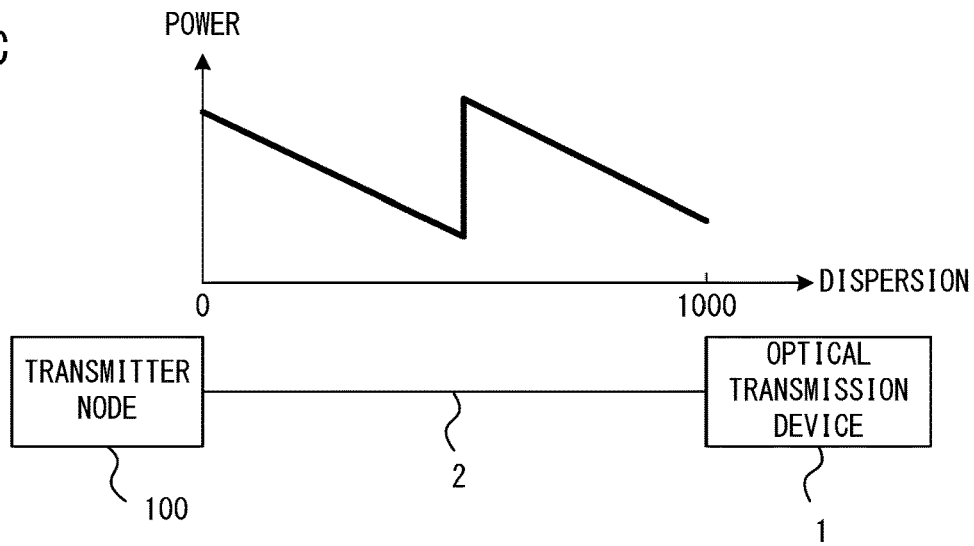

FIGS. 9A-9C illustrate an example of a method for generating a power profile. In this example, the total dispersion amount of the optical fiber transmission line 2 between the transmitter node 100 and the optical transmission device 1 is 1000 ps/nm. The profile generator 21 acquires a reception electric field information signal indicating the electric field of the optical signal received by the optical transmission device 1. The profile generator 21 acquires a reference signal indicating electric field information for generating an optical signal in the transmitter node 100. ΔCD used in the flowchart depicted in FIG. 5 is 10 ps/nm.

The profile generator 21 sets "CD1=10" and "CD2=990." The first dispersion compensator 16a compensates for dispersion in the reception electric field information signal by 10 ps/nm. The nonlinear compensator 16b compensates for the nonlinear distortion in an output signal of the first dispersion compensator 16a. The second dispersion compensator 16c compensates for dispersion in an output signal of the nonlinear compensator 16b by 990 ps/nm. The correlation calculator 16d calculates a correlation between the reference signal and an output signal of the second dispersion compensator 16c. This correlation value indicates the power of the optical signal at a position P1 indicated in FIG. 9A. The position P1 corresponds to a position shifted from the optical transmission device 1 toward the transmitter node 100 by a transmission distance corresponding to a dispersion of 10 ps/nm. In this example, the power of the optical signal at the position P1 is Q1.

Next, the profile generator 21 sets "CD1=20" and "CD2=980." The first dispersion compensator 16a compensates for dispersion in the reception electric field information signal by 20 ps/nm. The nonlinear compensator 16b compensates for the nonlinear distortion in an output signal of the first dispersion compensator 16a. The second dispersion compensator 16c compensates for dispersion in an output signal of the nonlinear compensator 16b by 980 ps/nm. The correlation calculator 16d calculates a correlation between the reference signal and an output signal of the second dispersion compensator 16c. This correlation value indicates the power of the optical signal at a position P2 indicated in FIG. 9B. The position P2 corresponds to a position shifted from the optical transmission device 1 toward the transmitter node 100 by a transmission distance corresponding to a dispersion of 20 ps/nm. In this example, the power of the optical signal at the position P2 is Q2.

Similarly, while shifting, in increments of ΔCD, the dispersion amounts by which the first dispersion compensator 16a and the second dispersion compensator 16c perform compensation, the profile generator 21 calculates optical power for each dispersion amount. As a result, a power profile indicating a relationship attained between the dispersion amount and the power of the optical signal corresponding to the transmission distance from the optical transmission device 1 is generated as indicated in FIG. 9C.

Figure 10:
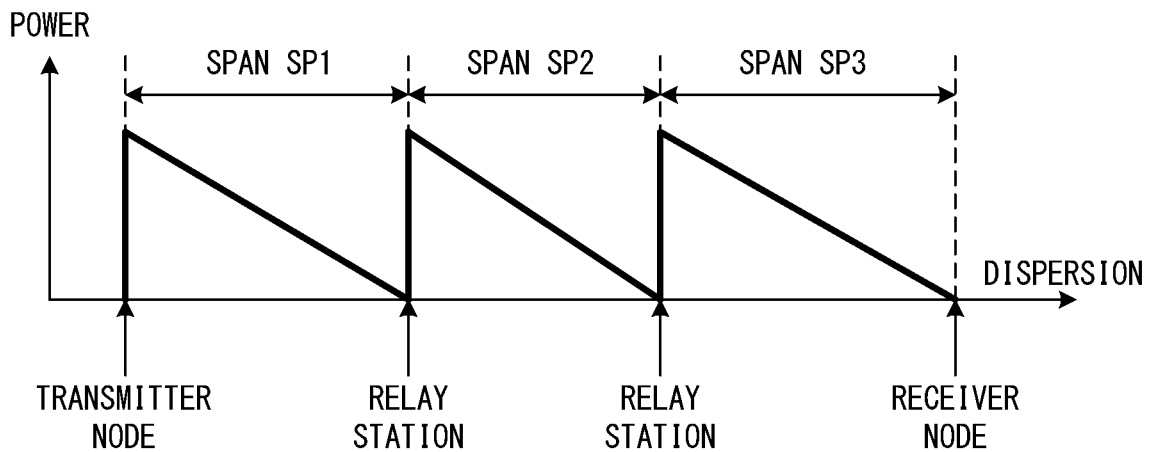
FIG. 10 illustrates an example of a method for detecting spans.

The span detector 22 detects one or more spans forming the optical fiber transmission line 2 by using the power profile generated by the profile generator 21. For example, the section between each peak and its adjacent peak appearing on the power profile may be detected as a span. In the example depicted in FIG. 10, three spans (SP1-SP3) are detected between the transmitter node and the receiver node. In this case, the span detector 22 may correct a peak position by using a calibration value prepared in advance.

The dispersion coefficient calculator 23 estimates a dispersion amount for each span detected by the span detector 22. The dispersion amount of a span corresponds to the difference between a dispersion value at which a peak appears on the power profile and a dispersion value at which its adjacent peak appears on the power profile. The dispersion coefficient calculator 23 calculates the dispersion coefficient of the optical fiber transmission line 2 for each span. In this case, the dispersion coefficient is calculated by, for example, dividing a dispersion amount estimated based on the power profile by a span length. The span length of each span is a known value and indicated by the span length data stored in the storage 30. For each span detected by the span detector 22, the fiber type estimator 24 estimates the type of an optical fiber forming the optical fiber transmission line 2 based on the dispersion coefficient calculated by the dispersion coefficient calculator 23. Note that processes performed by the dispersion coefficient calculator 23 and the fiber type estimator 24 will be described in detail with respect to examples described hereinafter.

First Embodiment

FIGS. 11A-11D illustrate an example of design information and established optical transmission systems in accordance with first to second embodiments. In this example, relay stations A1-A2 are provided on an optical fiber transmission line between a transmitter node TX and a receiver node RX. Thus, the optical fiber transmission line is formed from spans SP1-SP3. The span SP1 corresponds to a section between the transmitter node TX and the relay station A1. The span SP2 corresponds to a section between the relay stations A1 and A2. The span SP3 corresponds to a section between the relay station A2 and the receiver node RX.

Figure 11A:
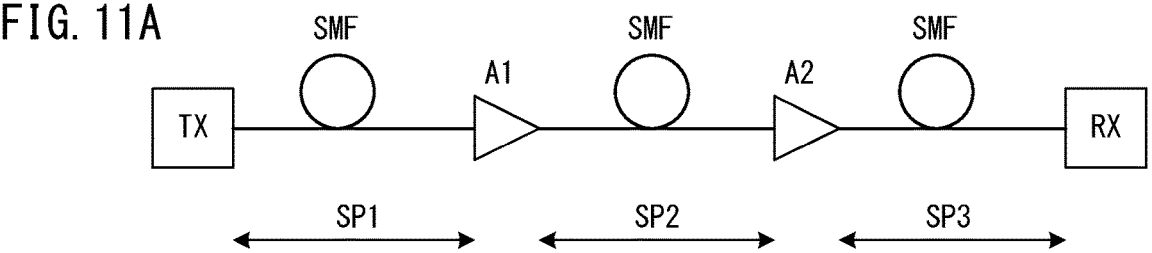
FIGS. 11A-11D illustrate an example of design information and established optical transmission systems.
Figure 11B:
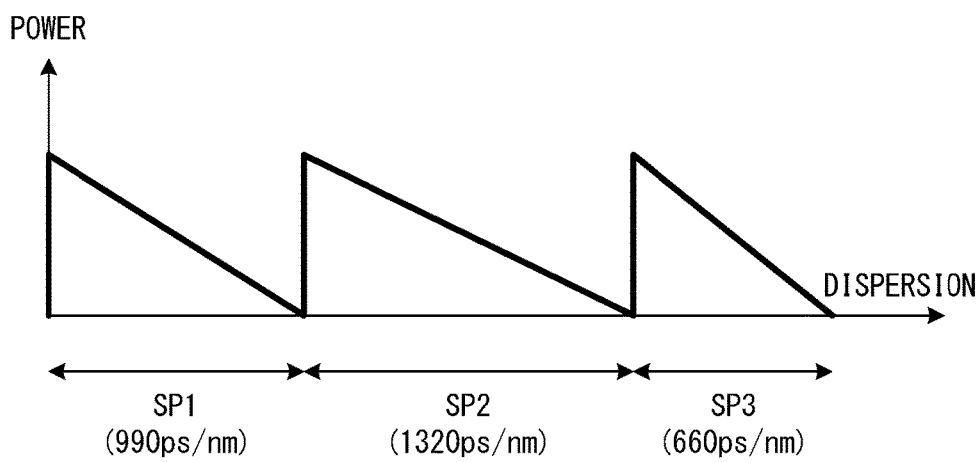

The design information in accordance with the first to second embodiments indicates the configuration depicted in FIG. 11A. That is, the optical transmission system is designed such that the spans SP1-SP3 are each formed from an SMF. In this example, the span length of each of the spans SP1-SP3 is a known value. The dispersion coefficient of the SMFs is also a known value. Thus, a power profile corresponding to the design information can be generated. FIG. 11B illustrates the power profile corresponding to the design information indicated in FIG. 11A. Note that the power profiles depicted in FIG. 11B and other figures merely schematically illustrate the relationships between dispersion amounts and optical powers, and the dispersion amounts, the optical powers, and the slopes in the graphs are not important.

Figure 11C:
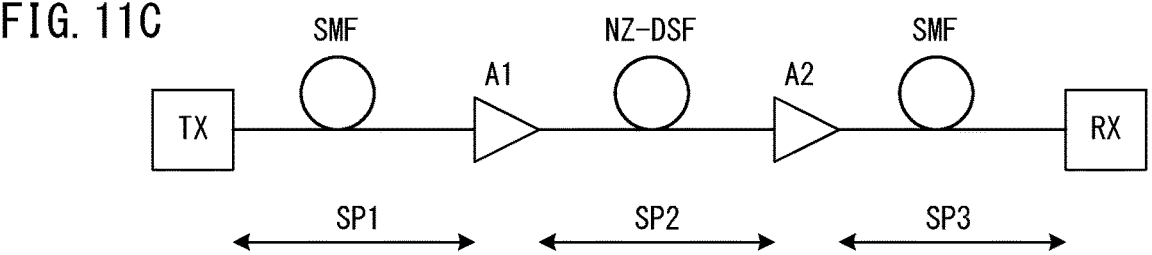

FIG. 11C illustrates an optical transmission system established based on design information. In this example, the spans SP1 and SP3 are formed from correct optical fibers. However, the span SP2 is formed from an incorrect optical fiber. Specifically, although the design information designates an SMF, a NZ-DSF is actually installed for the span SP2. The fiber type estimation device 20 acquires electric field information from the receiver node RX of the optical transmission system depicted in FIG. 11C.

Figure 11D:
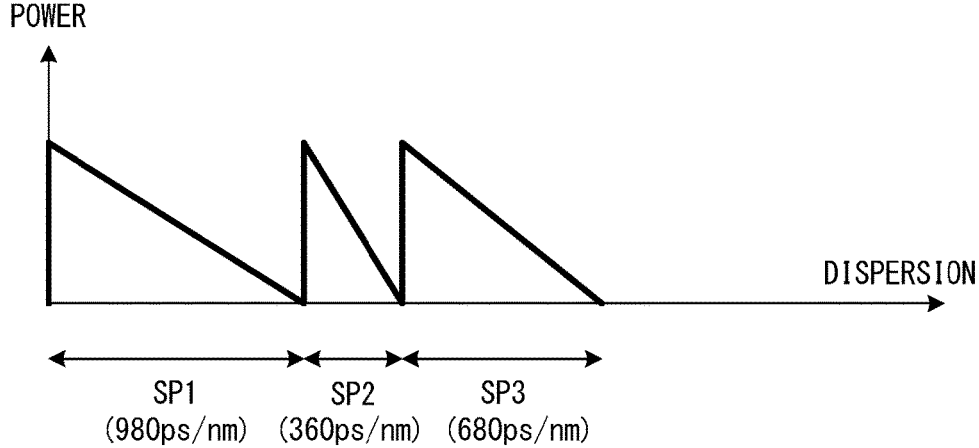
Figure 12:
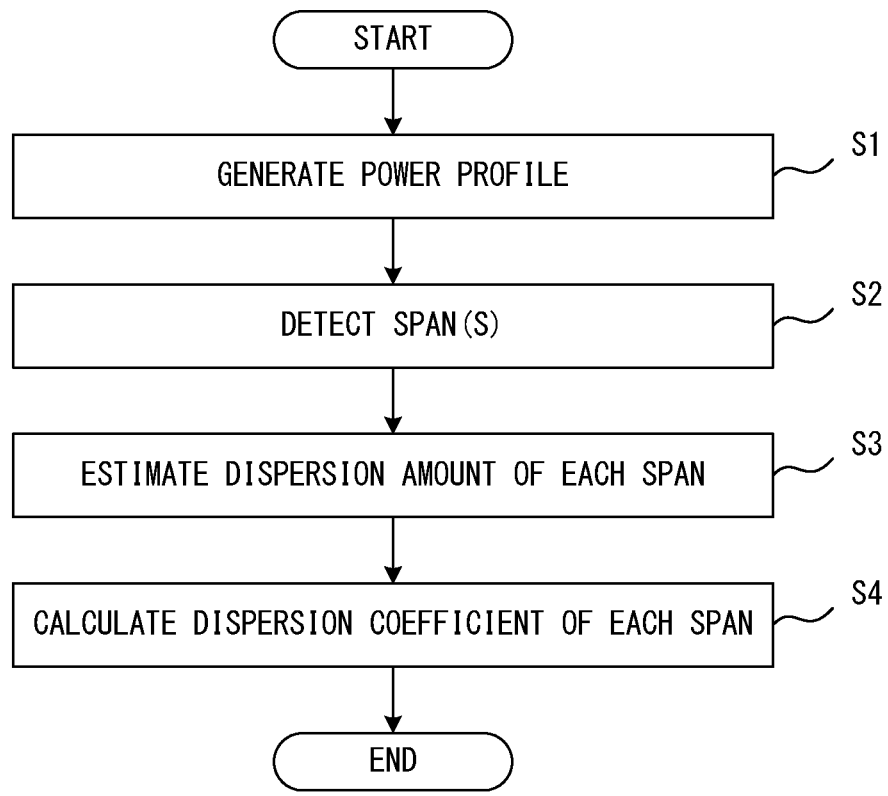
FIG. 12 is a flowchart illustrating processes performed by a fiber type estimation device in accordance with a first embodiment.

FIG. 12 is a flowchart illustrating processes performed by the fiber type estimation device 20 in accordance with the first embodiment. The following describes, based on the design information and measurement results depicted in FIGS. 11A-11D, the processes performed by the fiber type estimation device 20.

In S1, the profile generator 21 generates a power profile based on electric field information acquired from the receiver node. For example, FIG. 11D depicts the power profile of the optical transmission system indicated in FIG. 11C.

In S2, the span detector 22 detects one or more spans by using the power profile generated by the profile generator 21. In the example depicted in FIG. 11D, three spans SP1-SP3 are detected.

In S3, the dispersion coefficient calculator 23 estimates, for each span detected by the span detector 22, the dispersion amount of the optical fiber transmission line based on the power profile. In this example, the power profile plots the power of an optical signal with respect to the dispersion amount of the optical fiber transmission line. Thus, the dispersion amount of each span can be estimated by specifying dispersion values at which peaks of the optical power appear on the power profile. Estimated dispersion amounts of the respective spans are indicated in FIGS. 11D and 13.

In S4, the dispersion coefficient calculator 23 calculates the dispersion coefficient of the optical fiber transmission line for each span. The dispersion coefficient is calculated by dividing a dispersion amount estimated based on the power profile by a span length. The span length of each span is stored in the storage 30 as span length data. For example, the dispersion coefficient of the span SP1 may be obtained by dividing "980 ps/nm" by "60 km." That is, 16.3 ps/nm/km is obtained. A calculation result for each of the spans is indicated in FIG. 13.

As described above, in the first embodiment, the fiber type estimation device 20 can calculate the dispersion coefficient of each span of the optical transmission system. Thus, in the first embodiment, the fiber type estimation device 20 is used as a characteristics estimation device that estimates characteristics of optical fibers forming the spans of an optical transmission system.

In this example, the dispersion coefficient of each fiber type is a known value. For example, the dispersion coefficient of an SMF is 14 to 17 ps/nm, the dispersion coefficient of a NZ-DSF is 3 to 7 ps/nm, and the dispersion coefficient of a DSF is −2 to 2 ps/nm. Hence, a network system administrator can estimate the type of the optical fibers installed in the respective spans based on the dispersion coefficients calculated by the dispersion coefficient calculator 23. In the example indicated in FIG. 13, the estimated dispersion coefficients of the spans SP1 and SP3 are 16.3 and 17, respectively. Thus, it can be estimated that SMFs are installed in the spans SP1 and SP3. On the contrary, since the estimated dispersion coefficient of the span SP2 is 4.5, it can be estimated that a NZ-DSF is installed in the span SP2.

In the meantime, measuring the dispersion amount of each span allows the type of an optical fiber installed in each span to be estimated. However, several tens of relay stations may be provided between a transmitter node and a receiver node in a large scale network. That is, an optical fiber transmission line may be formed from several tens of spans. Thus, much effort will be required to allow each relay station to measure the dispersion amount of a corresponding span. By contrast, the fiber type estimation device 20 can estimate the dispersion amount and the dispersion coefficient of each span based on electric field information generated by a receiver node, thereby decreasing effort to be made by the network system administrator.

Second Embodiment

In the first embodiment, the dispersion coefficient of each span of the optical transmission system is calculated. In the second embodiment, the fiber type of each span is determined using dispersion coefficients calculated in the first embodiment. For the second embodiment, processes performed by the fiber type estimation device 20 will also be described by referring to FIGS. 11A-11D.

Figure 14:
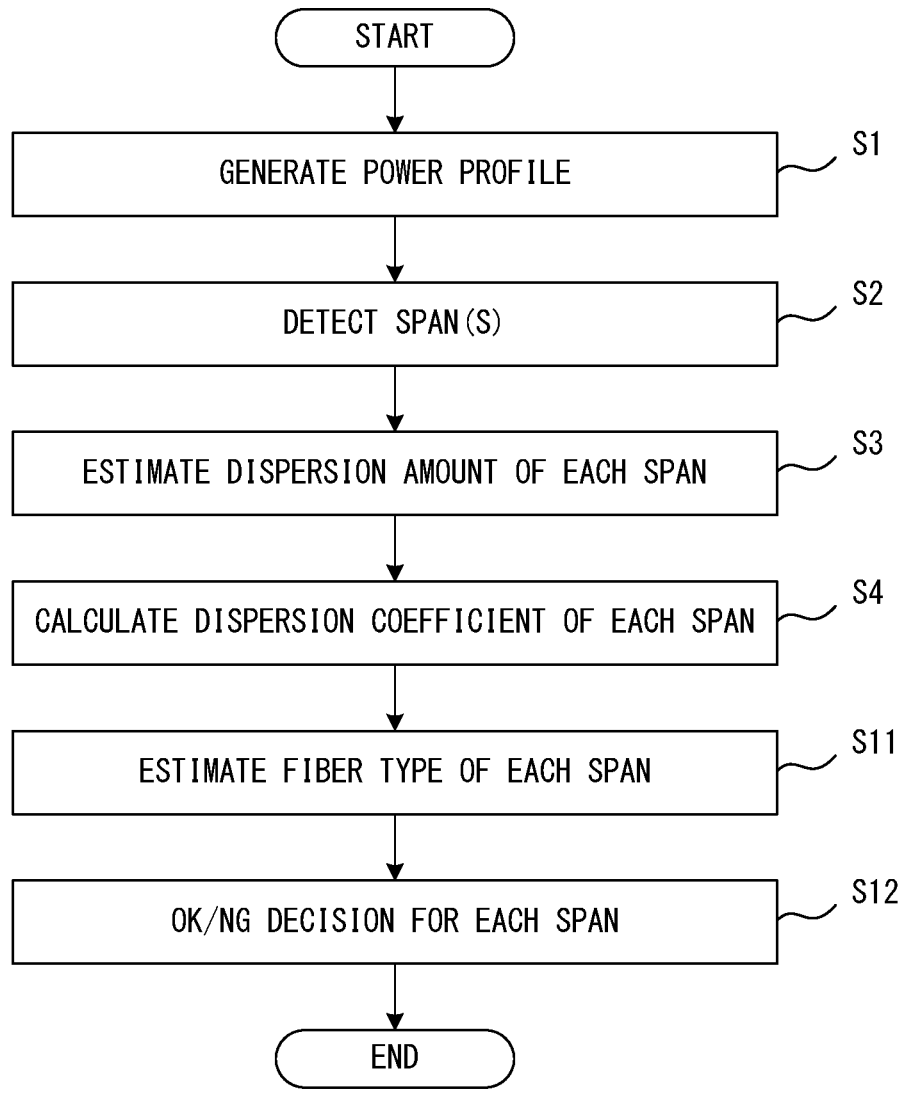
FIG. 14 is a flowchart illustrating processes performed by a fiber type estimation device in accordance with a second embodiment.

FIG. 14 is a flowchart illustrating processes performed by the fiber type estimation device 20 in accordance with the second embodiment. S1-S4 in FIG. 14 are the same as those in FIG. 12. Thus, the fiber type estimation device 20 calculates the dispersion coefficient of each span.

In S11, for each span detected by the span detector 22, the fiber type estimator 24 estimates the type of an optical fiber forming the optical fiber transmission line based on the dispersion coefficient calculated by the dispersion coefficient calculator 23. In this case, the fiber type estimator 24 refers to fiber data depicted in FIG. 15A. The fiber data indicates a dispersion coefficient for each fiber type. For example, the dispersion coefficient of an SMF is 14 to 17 ps/nm, the dispersion coefficient of a NZ-DSF is 3 to 7 ps/nm, and the dispersion coefficient of a DSF is −2 to 2 ps/nm.

In the example depicted in FIGS. 11C and 11D, the dispersion coefficient calculated for the span SP1 by the dispersion coefficient calculator 23 is 16.3 ps/nm. This value corresponds to the dispersion coefficient of an SMF. Thus, the fiber type estimator 24 estimates that the optical fiber installed in the span SP1 is an SMF. Similarly, it is estimated that the optical fiber installed in the span SP3 is also an SMF. Meanwhile, the dispersion coefficient calculated for the span SP2 by the dispersion coefficient calculator 23 is 4.5 ps/nm. This value corresponds to the dispersion coefficient of a NZ-DSF. Thus, the fiber type estimator 24 estimates that the optical fiber installed in the span SP2 is a NZ-DSF.

In S12, the fiber type estimator 24 decides whether the optical fiber transmission line has been correctly established for each span in accordance with design information. In this example, the optical transmission system is designed such that SMFs are installed in the spans SP1-SP3. In this regard, the fiber type estimator 24 estimates that the spans SP1 and SP3 are each formed from an SMF. Thus, the fiber type estimator 24 determines that correct optical fibers have been installed in the spans SP1 and SP3. Meanwhile, the fiber type estimator 24 estimates that the span SP2 is formed from a NZ-DSF. Thus, the fiber type estimator 24 determines that an incorrect optical fiber has been installed in the span SP2. FIG. 15B indicates results of estimation and determination by the fiber type estimator 24.

Third Embodiment

In the first and second embodiments, the fiber type of each span is estimated. However, one span may include a plurality of fiber types. Accordingly, in the third embodiment, the fiber type estimation device 20 estimates a plurality of fiber types in a span.

Figure 16A:
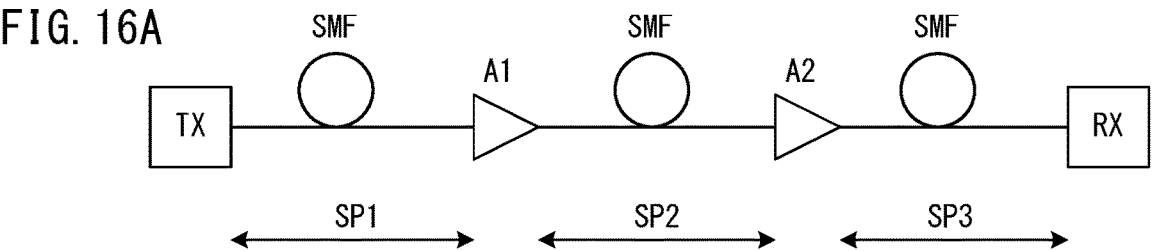
FIGS. 16A-16D illustrate an example of design information and established optical transmission systems in accordance with a third embodiment.
Figure 16B:
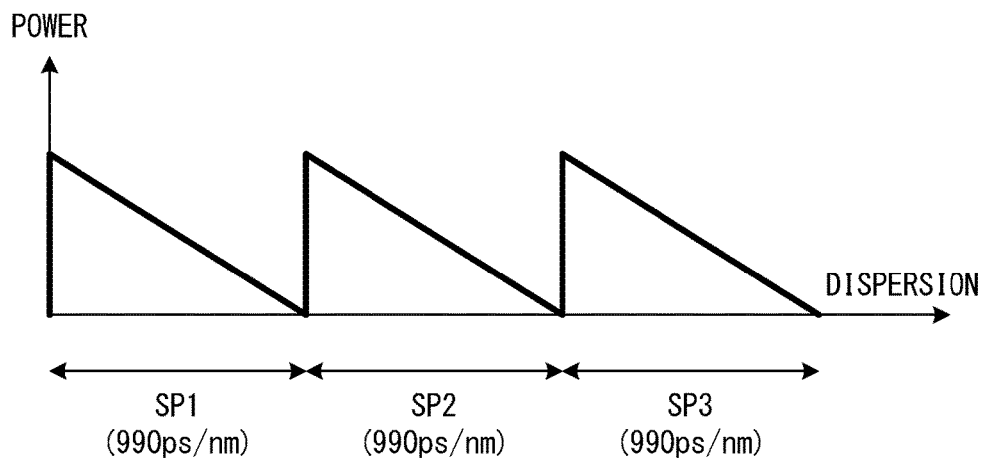

FIGS. 16A-16D illustrate an example of design information and established optical transmission systems in accordance with the third embodiment. As indicated in FIG. 16A, the design information designates a fiber type for each span. In this example, a design is made such that SMFs are installed in the spans SP1-SP3. The design information may also include information indicating the span length of each span. FIG. 16B indicates a power profile obtained for the design information.

Figure 16C:
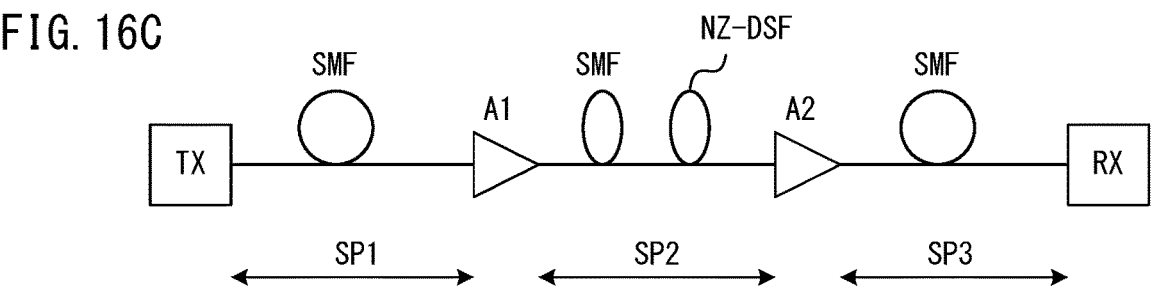

FIG. 16C illustrates the configuration of an optical transmission system established based on the design information. In this example, correct optical fibers are installed in the spans SP1 and SP3. However, an incorrect optical fiber is installed in the span SP2. Specifically, although the design information indicates an SMF should be installed in the span SP2, the optical fiber transmission line of the span SP2 is formed from an SMF and a NZ-DSF.

Figure 16D:
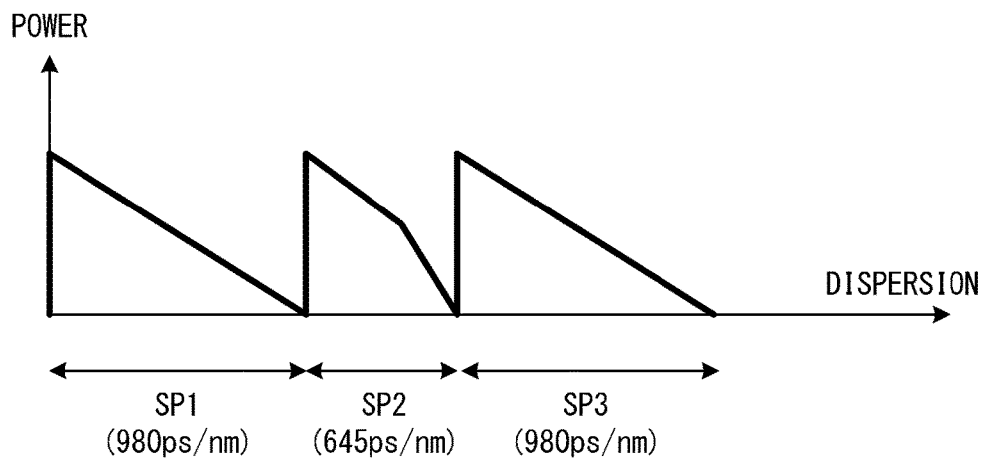

FIG. 16D depicts the power profile of the optical fiber transmission line indicated in FIG. 16C. As described above, the power profile is generated based on electric field information detected by the receiver node RX.

Figure 17:
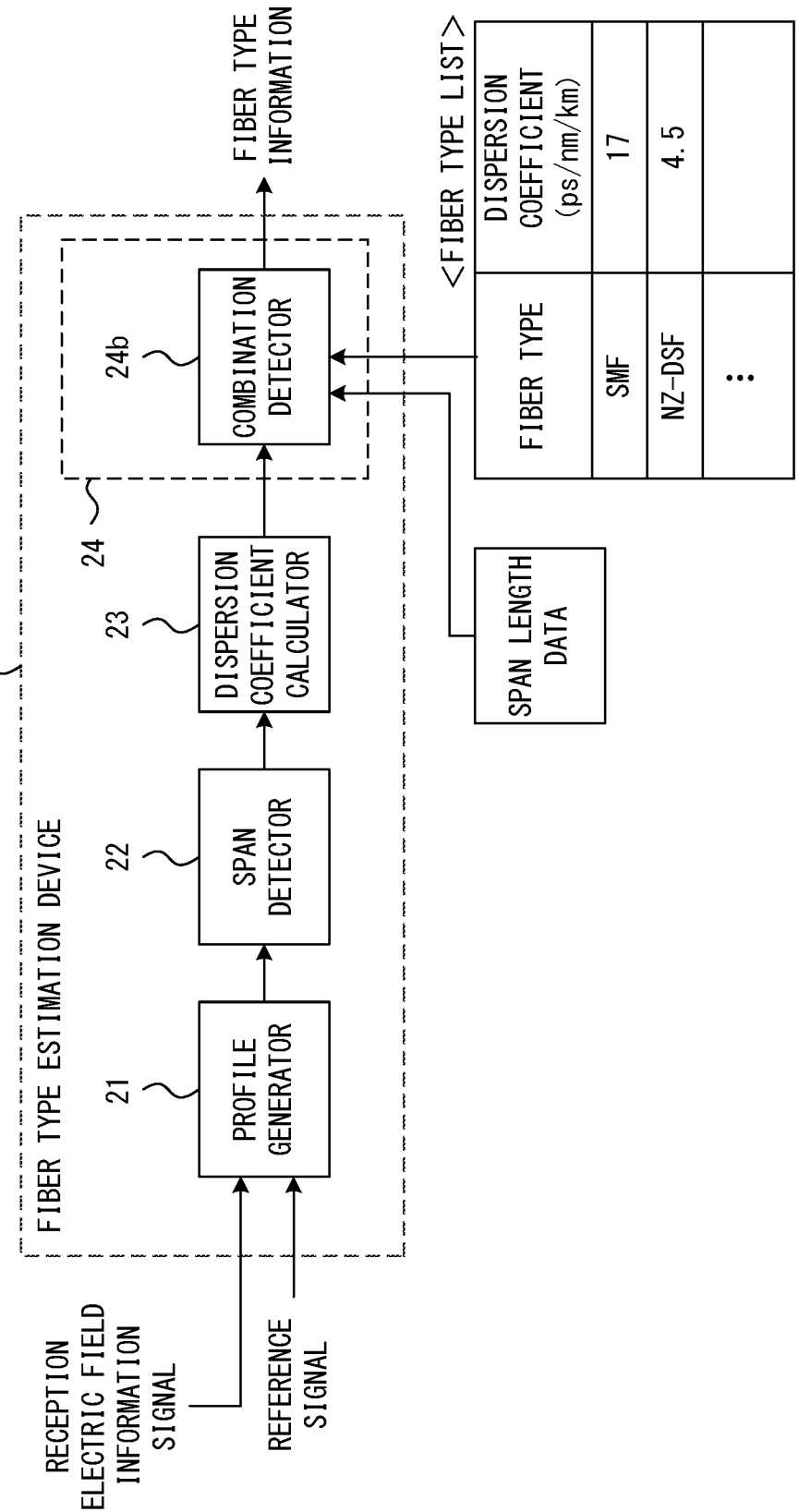
FIG. 17 illustrates an example of a fiber type estimation device in accordance with the third embodiment.

FIG. 17 illustrates an example of the fiber type estimation device 20 in accordance with the third embodiment. In the third embodiment, the fiber type estimator 24 includes a combination detector 24b. The fiber type estimation device does not necessarily need to calculate the dispersion coefficient of each span.

The combination detector 24b refers to a fiber type list so as to detect a combination of optical fibers forming each span. The fiber type list is an example of fiber data stored in the storage 30 and indicates a dispersion coefficient for each fiber type.

Figure 18:
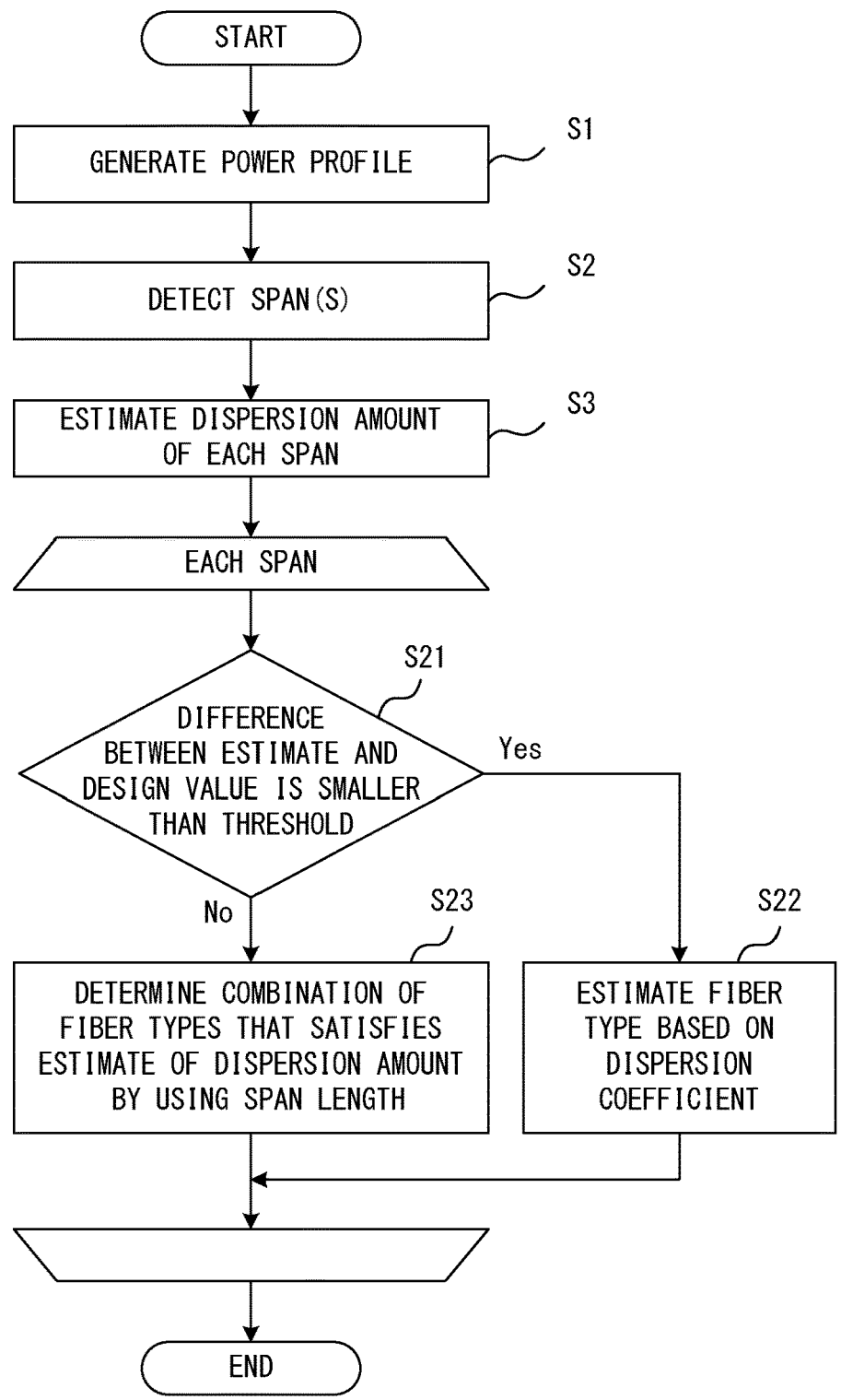
FIG. 18 is a flowchart illustrating processes performed by the fiber type estimation device in accordance with the third embodiment.

FIG. 18 is a flowchart illustrating processes performed by the fiber type estimation device 20 in accordance with the third embodiment. S1-S3 in FIG. 18 are the same as those in FIG. 12. Thus, the fiber type estimation device 20 calculates the dispersion amount of each span. In the example depicted in FIGS. 16C and 16D, dispersion amounts calculated for the spans SP1, SP2, and SP3 are respectively 980 ps/nm, 645 ps/nm, and 980 ps/nm.

The processes of S21-S23 are performed for each span. Note that, in descriptions pertaining to FIG. 18, a span for which the processes of S21-S23 are performed may be referred to as an "objective span."

In S21, the fiber type estimator 24 compares an estimate with a design value for the dispersion amount of the objective span. The estimate of the dispersion amount is obtained through S1-S3. The design value for the dispersion amount is calculated in advance based on design information indicating the fiber type and the span length. When the difference between the estimate and the design value is smaller than a threshold, the fiber type estimator 24 determines that a correct optical fiber has been installed in the objective span. In this case, the fiber type estimator 24 estimates, in S22, the fiber type of the objective span based on the dispersion coefficient. The method for calculating the dispersion amount of the objective span and the method for estimating the fiber type of the objective span based on the dispersion coefficient are the same as those described above with respect to the second embodiment. The threshold may be set to, but is not particularly limited to, about 10 percent of the design value.

When the difference between the estimate and the design value is larger than the threshold, the fiber type estimator 24 determines that an incorrect optical fiber has been installed in the objective span. In this case, the combination detector 24b determines, in S23, a combination of fiber types that satisfies the estimate of the dispersion amount by using the fiber type list and the span length of the objective span.

The following describes the processes of S21-S23 by referring to the case indicated in FIGS. 16C and 16D. A design value for the dispersion amount of the span SP1 is 990 ps/nm, and an estimate of the dispersion amount is 980 ps/nm. Thus, the difference between the design value and the estimate is sufficiently small. In this case, the fiber type estimator 24 calculates, in S22, the dispersion coefficient of the span SP1. In this example, "16.3 ps/nm/km" is obtained by dividing "980 ps/nm" by "60 km." This dispersion coefficient corresponds to the dispersion coefficient of an SMF according to the fiber data indicated in FIG. 15A and the fiber type list indicated in FIG. 17. Thus, the fiber type estimator 24 estimates that the optical fiber installed in the span SP1 is an SMF. The same is also true for the span SP3.

When the difference between the design value and the estimate is sufficiently small, the fiber type estimator 24 determines that a correct optical fiber has been installed in the objective span. According to the design information depicted in FIG. 16A, an SMF is used in the span SP1. Thus, by referring to the design information, the fiber type estimator 24 may estimate that the optical fiber installed in the span SP1 is an SMF.

A design value for the dispersion amount of the span SP2 is 990 ps/nm, and an estimate of the dispersion amount is 645 ps/nm. Thus, the difference between the design value and the estimate is large. In this case, the combination detector 24b determines a combination of fiber types in S23.

For simplicity of descriptions, assume that the only fiber types that may possibly be used in the optical fiber transmission line are SMF and NZ-DSF. In this case, formula (1) is satisfied for the span SP2. CD_2 indicates the dispersion amount of the span SP2 estimated based on the power profile. L_2 indicates the span length of the span SP2. D_SMF indicates the dispersion coefficient of an SMF. D_NZDSF indicates the dispersion coefficient of a NZ-DSF. X indicates the proportion of the length of the SMF to the span length of the span SP2.

$$CD\_2 = D\_SMF \times L\_2 \times X + D\_NZDSF \times L\_2 \times (1-X) \quad (1)$$

Assigning "CD_2=645 ps/nm," "D_SMF=17 ps/nm/km," "D_NZDSF=4.5 ps/nm/km," and "L_2=60 km" to formula (1) provides "X=0.5." In this case, multiplying the span length of the span SP2 (60 km) by "X" provides the calculation result that the length of the SMF is 30 km. Meanwhile, multiplying the span length of the span SP2 (60 km) by "1−X" provides the calculation result that the length of the NZ-DSF is 30 km. Thus, the combination detector 24b determines that the span SP2 is formed from an SMF having a length of 30 km and a NZ-DSF having a length of 30 km.

As described above, according to the flowchart depicted in FIG. 18, the process of S23 is performed only for a span having a large difference between an estimate and a design value for a dispersion amount. Hence, loads resulting from the process of estimating the fiber type of each span of the optical fiber transmission line can be decreased. A large scale network having many spans can exhibit the especially large effect of decreasing the amount of processing to be performed by the fiber type estimation device 20.

The number of optical fibers forming an objective span and the lengths of the respective optical fibers may be known values. For the case depicted in FIGS. 16C and 16D, assume, for example, that: it is known that the span SP2 has been formed from two optical fibers and that each of the optical fibers has a length of 30 km; at least one of the two optical fibers forming the span SP2 is an SMF; and the dispersion coefficients of SMF, NZ-DSF, DSF, and LS are respectively 17 ps/nm, 4.5 ps/nm, 0 ps/nm, and −1.75 ps/nm.

In this case, the combination detector 24b detects the fiber types of the span SP2 by using formula (2). D_1 indicates the dispersion coefficient of one optical fiber (in this example, SMF) among the two optical fibers forming the span SP2, and D_2 indicates the dispersion coefficient of the other optical fiber (in this example, SMF, NZ-DSF, DSF, or LS).

$$CD\_2 = D\_1 \times L\_2 \times X + D\_2 \times L\_2 \times (1-X) \quad (2)$$

When it is assumed that the two optical fibers forming the objective span are both SMFs, "CD_2=645 ps/nm," "D_1=17 ps/nm/km," "D_2=17 ps/nm/km," and "L_2=60 km" can be assigned to formula (2). In this case, "X" is not fixed. Thus, it is determined that the assumption that "the other optical fiber is an SMF" is incorrect.

When it is assumed that the other optical fiber is a DSF, "D_2=0" holds. In this case, "X=38 km" is obtained. This is inconsistent with the fact that "each of the optical fibers has a length of 30 km." Thus, it is determined that the assumption that "the other optical fiber is a DSF" is incorrect.

When it is assumed that the other optical fiber is an LS, "D_2=−1.75 ps/nm/km" holds. In this case, "X=40 km" is obtained. This is inconsistent with the fact that "each of the optical fibers has a length of 30 km." Thus, it is determined that the assumption that "the other optical fiber is an LS" is incorrect.

When it is assumed that the other optical fiber is a NZ-DSF, "D_2=4.5 ps/nm/km" holds. In this case, "X=30 km" is obtained. This is consistent with the fact that "each of the optical fibers has a length of 30 km." Thus, it is determined that the assumption that "the other optical fiber is a NZ-DSF" is correct. FIG. 19 indicates the results of determination by the combination detector 24b.

Figure 20A:
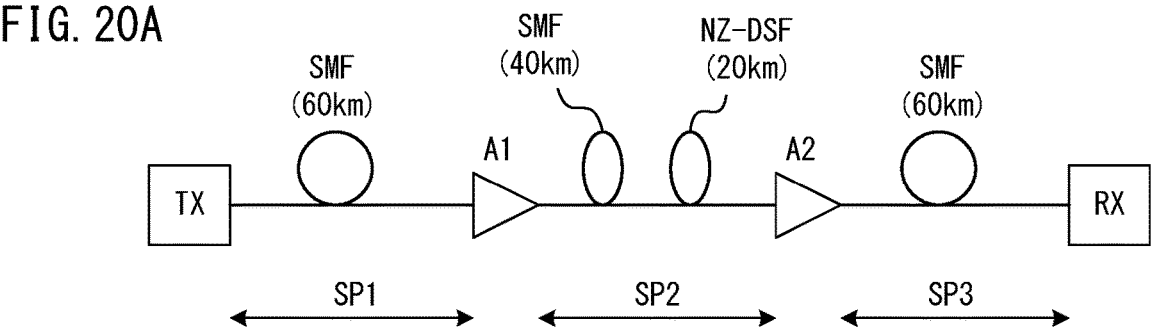
FIGS. 20A-20C illustrate another example of design information and established optical transmission systems in accordance with the third embodiment.
Figure 20B:
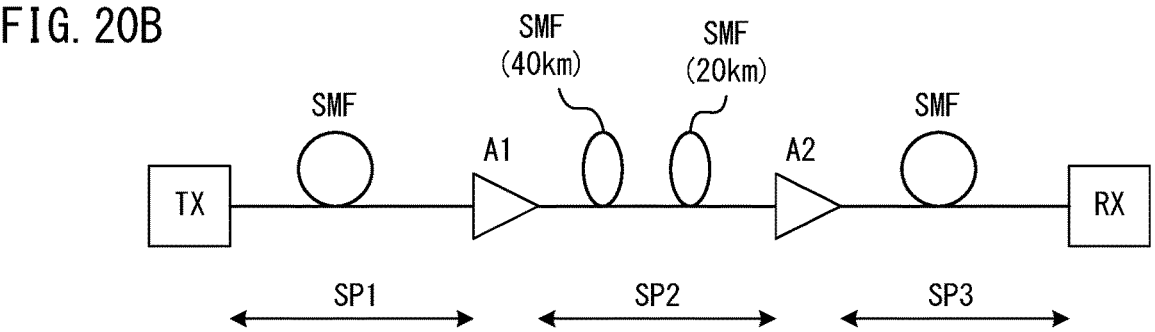
Figure 20C:
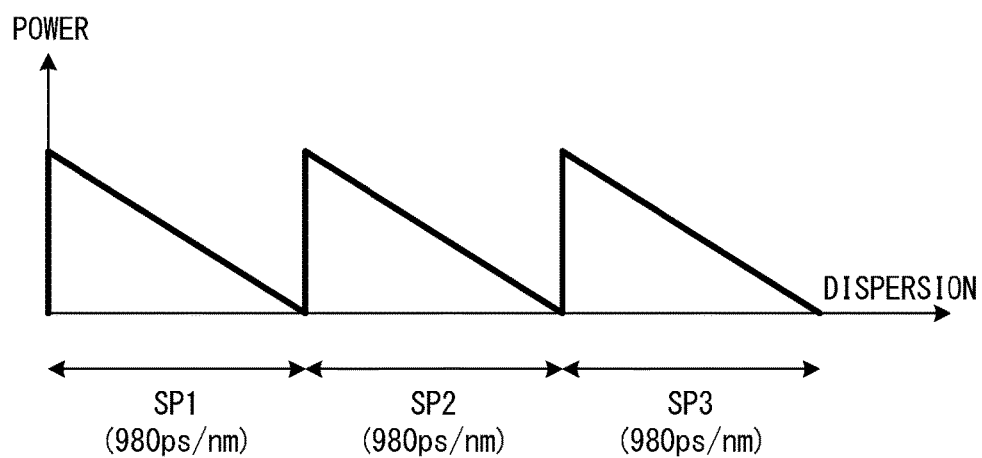

FIGS. 20A-20C illustrate another example of design information and established optical transmission systems. As indicated in FIG. 20A, the design information designates a fiber type for each span. In this example, the spans SP1 and SP3 should each be formed from an SMF having a length of 40 km, and the span SP2 should be formed from an SMF having a length of 40 km and a NZ-DSF having a length of 20 km.

However, as depicted in FIG. 20B, the span SP2 is actually formed from an SMF having a length of 40 km and an SMF having a length of 20 km. FIG. 20C depicts a power profile generated for the optical transmission system depicted in FIG. 20B.

The fiber type estimation device 20 estimates the fiber type of each span based on the power profile indicated in FIG. 20C. Specifically, the fiber types are estimated using the above-described formula (1). In this regard, when estimating the fiber type of the span SP2, "CD_2=980 ps/nm," "D_SMF=17 ps/nm/km," "D_NZDSF=4.5 ps/nm/km," and "L_2=60 km" are assigned to formula (1). As a result, "X=0.944" is obtained. "X=1" is allowable with an error taken into consideration. In the meantime, "X=1" indicates that the entirety of the span SP2 is formed from SMF. Thus, the combination detector 24b determines that the span SP2 is formed from an SMF having a length of 40 km and an SMF having a length of 20 km.

A span may be formed from three or more optical fibers. In addition, an optical fiber other than SMF and NZ-DSF may be used. Thus, the combination detector 24b may detect the fiber types in a span by using formula (3). CD indicates an estimate of the dispersion amount of an objective span. L indicates the span length of the objective span. When the objective span is formed from n optical fibers, D_i identifies the dispersion coefficient of an i-th optical fiber among the n optical fibers. X_i indicates the proportion of the length of the i-th optical fiber to the span length of the objective span.

$$CD = \sum_{i=1}^{n} D\_i \times (L \times X\_i) \quad (3)$$

$$\sum_{i=1}^{n} X\_i = 1$$

The combination detector 24b solves an optimization problem (or mathematical planning problem) for determining D_i (i=1 to n) and X_i (i=1 to n). In this way, the fiber types in the objective span are estimated.

Fourth Embodiment

Figure 21A:
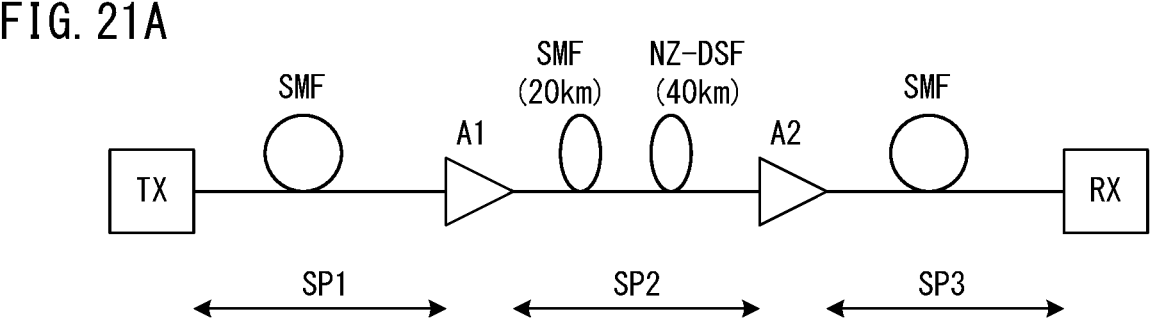
FIGS. 21A and 21B illustrate examples of optical fiber transmission lines in which optical fibers are connected in different orders.
Figure 21B:
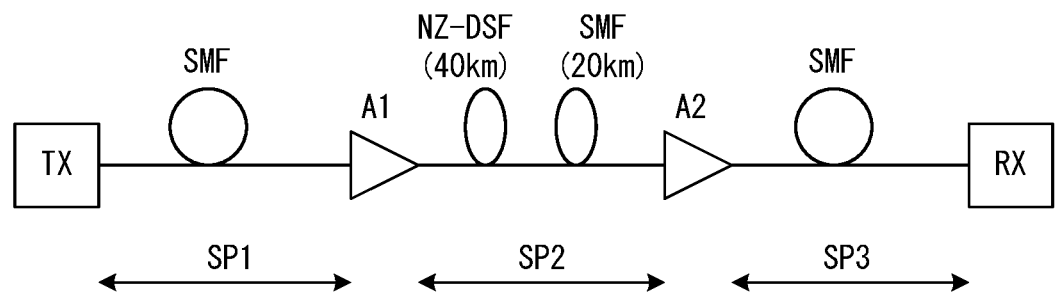

In the third embodiment, a plurality of fiber types in a span are estimated. Assume, for example, that, as depicted in FIGS. 21A and 21B, the span SP2 is formed from an SMF and a NZ-DSF. In this case, according to the above-described formula (1), it can be estimated that the span SP2 is formed from an SMF and a NZ-DSF, and the length of each optical fiber can be estimated.

In the fourth embodiment, in addition to the estimation of fiber types, it is estimated in what order optical fibers of different types are connected. For example, in the case depicted in FIG. 21A, an SMF is provided on the transmitter-node side, and a NZ-DSF is provided on the receiver-node side. Meanwhile, in the case depicted in FIG. 21B, a NZ-DSF is provided on the transmitter-node side, and an SMF is provided on the receiver-node side. In the fourth embodiment, the two cases depicted in FIGS. 21A and 21B can be identified.

In the fourth embodiment, the optical transmission system has a function for detecting, when two or more optical fibers are provided in one span, a connection point between the two or more optical fibers. For example, this function may be implemented by an OTDR. The OTDR causes optical pulses to enter an optical fiber and detects reflection light from the optical fiber. Then, the propagation time of the optical pulses is measured based on a timing at which the reflection light is received, so as to detect the distance to a discontinuous point in the optical fiber transmission line. Thus, for example, each node and each relay station may be provided with an OTDR so that the connection points between the optical fibers in each span can be detected. That is, when two or more optical fibers are provided in one span, the length of each optical fiber can be detected. Connection point information indicating the position of a connection point between optical fibers is supplied to the fiber type estimation device 20. Note that the connection point between optical fibers may be detected by a single-wavelength OTDR without using a multi-wavelength OTDR which would be expensive.

Figure 22:
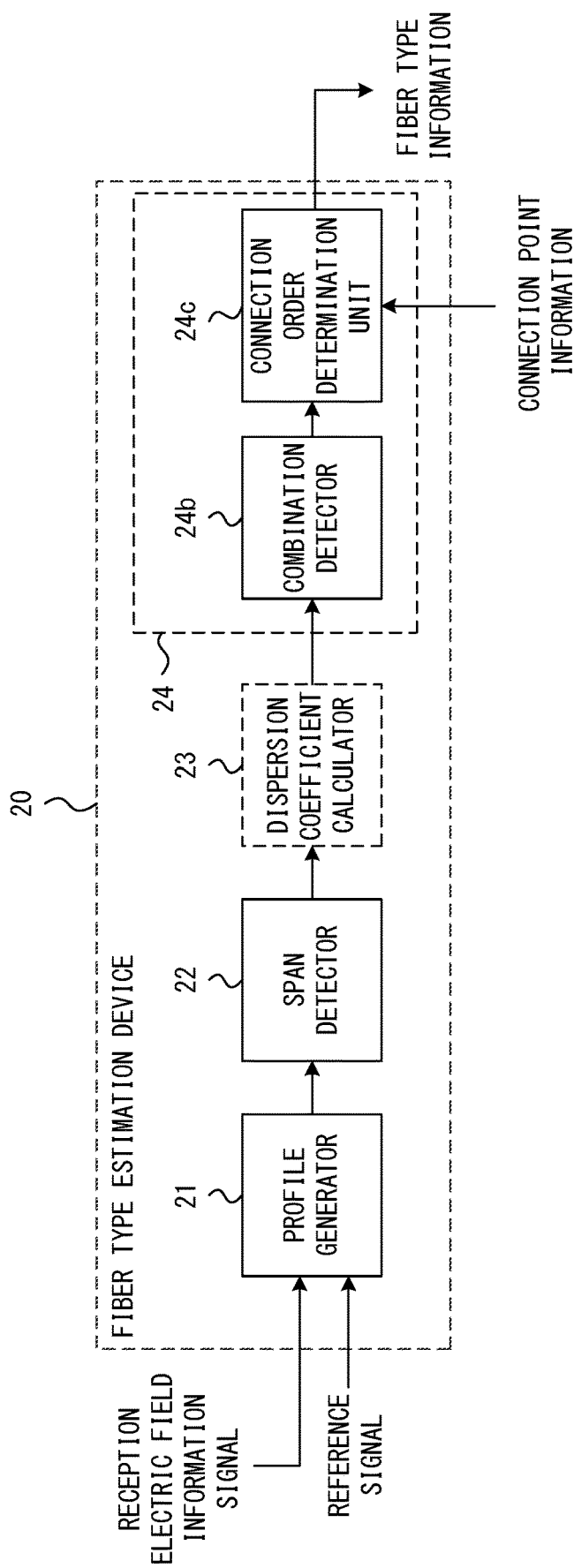
FIG. 22 illustrates an example of a fiber type estimation device in accordance with a fourth embodiment.

FIG. 22 illustrates an example of the fiber type estimation device 20 in accordance with the fourth embodiment. In the fourth embodiment, the fiber type estimator 24 includes a combination detector 24b and a connection order determination unit 24c. The fiber type estimation device 20 does not need to calculate the dispersion coefficient of each span.

As in the third embodiment, the combination detector 24b detects a combination of optical fibers forming each span. The connection order determination unit 24c determines an order in which the optical fibers detected by the combination detector 24b are connected. In this case, by using connection point information, the connection order determination unit 24c determines an order in which the optical fibers are connected.

Figure 23:
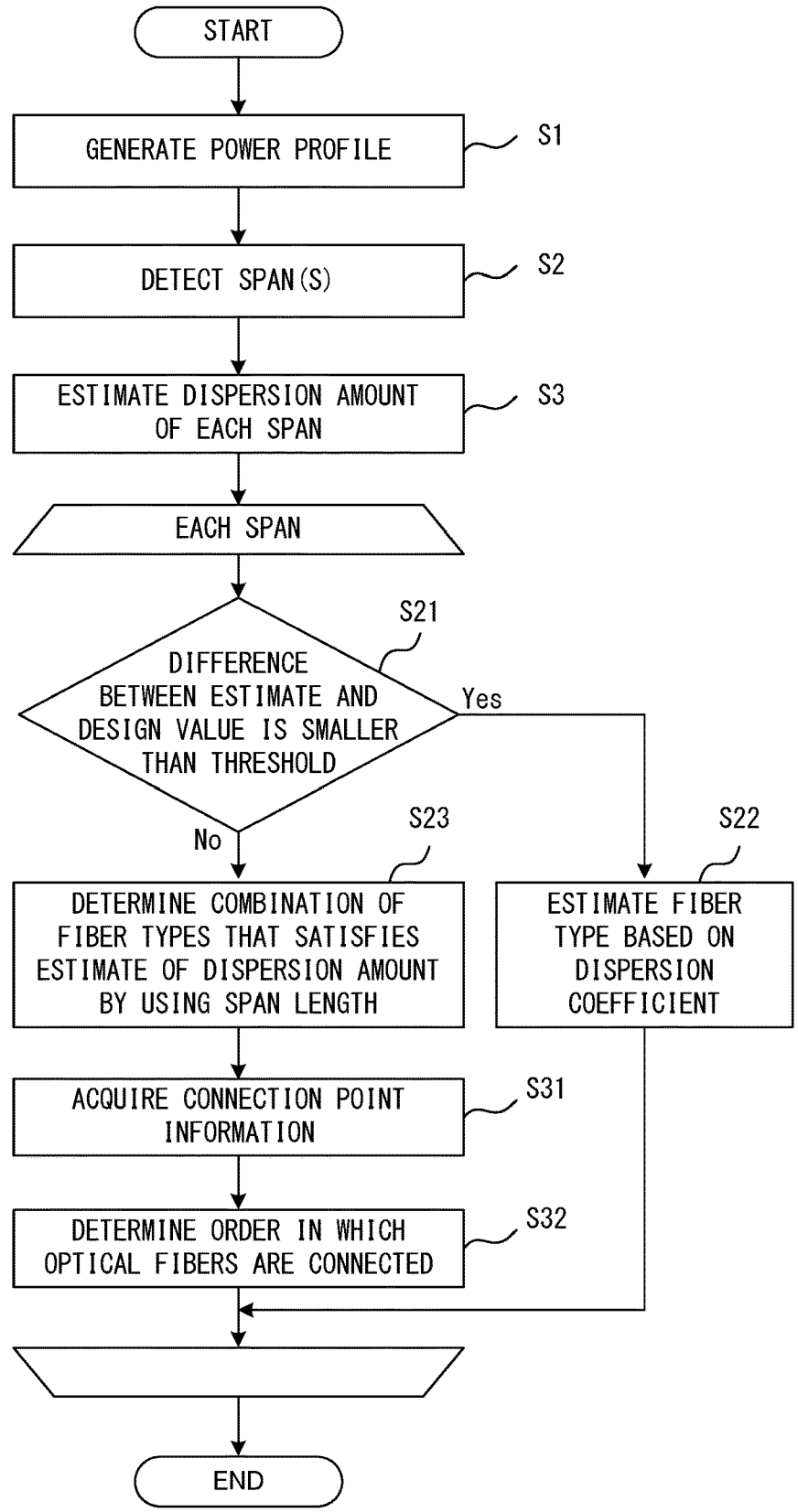
FIG. 23 is a flowchart illustrating processes performed by the fiber type estimation device in accordance with the fourth embodiment.

FIG. 23 is a flowchart illustrating processes performed by the fiber type estimation device 20 in accordance with the fourth embodiment. S1-S3 in FIG. 23 are the same as those in FIG. 12. Thus, the fiber type estimation device 20 calculates the dispersion amount of each span. Meanwhile, S21-S23 in FIG. 23 are the same as those in FIG. 18. Thus, the fiber type estimation device 20 estimates the type and the dispersion amount of each optical fiber in an objective span.

In S31, the connection order determination unit 24c acquires connection point information. As described above, the connection point information indicates the position of a connection point between optical fibers in a span. Thus, the connection point information substantially indicates the length of each optical fiber in the span. The connection point information can be acquired using an OTDR. In S32, the connection order determination unit 24c determines, based on the connection point information and the fiber types estimated in S23, an order in which the optical fibers in the objective span are connected.

Assume, for example, that: the combination detector 24b in the optical transmission system depicted in FIG. 21A or 21B has estimated that the span SP2 is formed from an SMF having a length of 20 km and a NZ-DSF having a length of 40 km; and by using, for example, an OTDR, a connection point between the optical fibers has been detected at a position distant from the relay station A1 by 20 km. In this case, the connection order determination unit 24c estimates that an optical fiber connected to the relay station A1 is an SMF and that an optical fiber connected to the relay station A2 is a NZ-DSF.

Fifth Embodiment

In the fourth embodiment, as described above, it is determined in what order optical fibers of different types are connected in a span. However, in the fourth embodiment, the position of the connection point between optical fibers in a span needs to be detected. By contrast, in the fifth embodiment, even when the position of the connection point between optical fibers is unknown, it can be determined in what order a plurality of optical fibers are connected in a span.

Figure 24A:
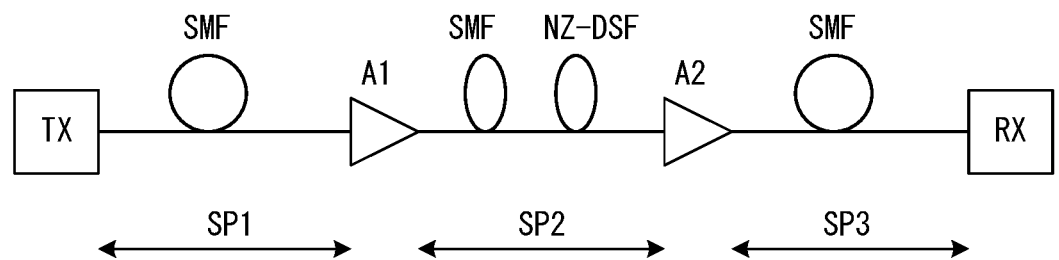
FIGS. 24A and 24B are explanatory diagrams for a method for estimating a fiber type in a fifth embodiment.
Figure 24B:
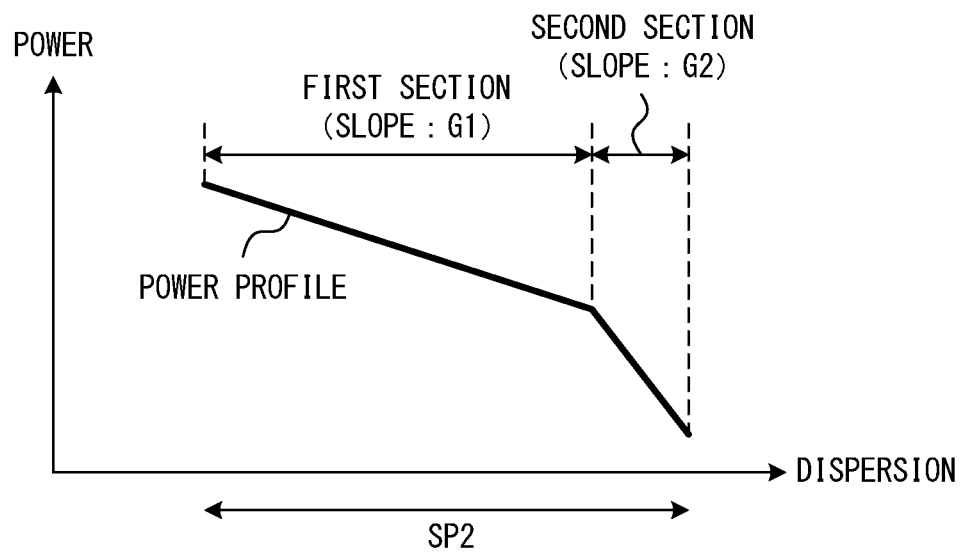

FIGS. 24A and 24B are explanatory diagrams for a method for estimating a fiber type in the fifth embodiment. In this example, as depicted in FIG. 24A, the span SP2 is formed from an SMF and a NZ-DSF. FIG. 24B indicates a power profile generated for the span SP2 by the profile generator 21. Note that the power profiles of the spans SP1 and SP3 are omitted.

Figure 25:
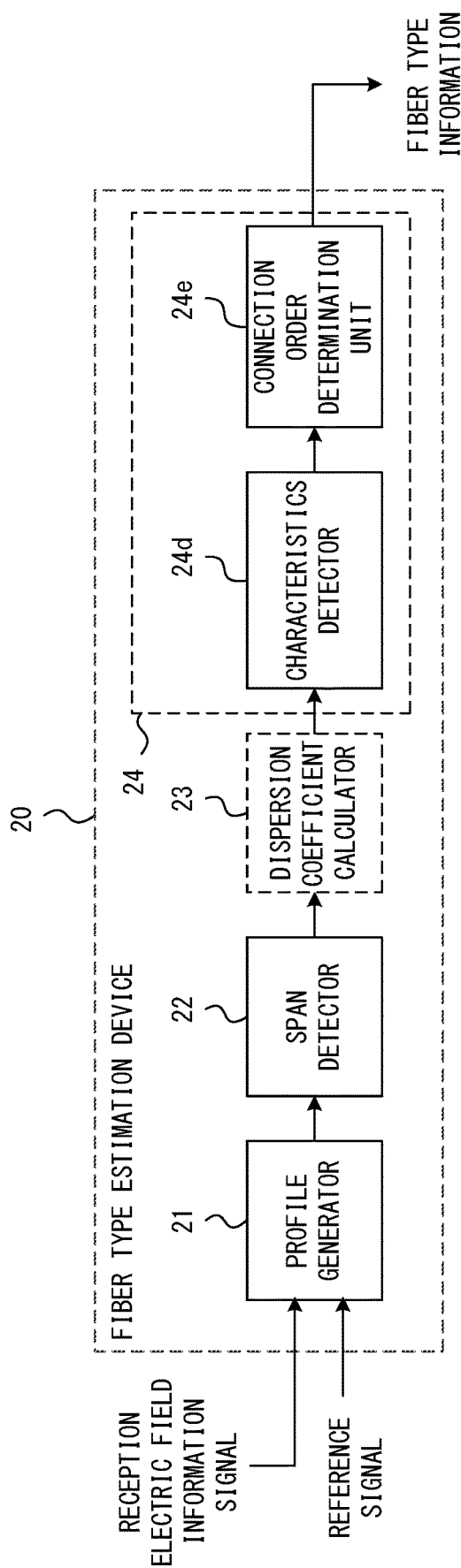
FIG. 25 illustrates an example of a fiber type estimation device in accordance with the fifth embodiment.

FIG. 25 illustrates an example of the fiber type estimation device 20 in accordance with the fifth embodiment. In the fifth embodiment, the fiber type estimator 24 includes a characteristics detector 24d and a connection order determination unit 24e. The fiber type estimation device 20 does not need to calculate the dispersion coefficient of each span.

The characteristics detector 24d detects characteristics of the shape of a power profile generated by the profile generator 21. In this example, the characteristics detector 24d detects a slope of the power profile of an objective span (in this example, span SP2). The connection order determination unit 24e determines, based on the characteristics detected by the characteristics detector 24d, an order in which the optical fibers in the objective span are connected.

According to the power profile depicted in FIG. 24B, the span SP2 is formed from two sections having different slopes. In particular, the span SP2 is formed from a first section having a slope G1 and a second section having a slope G2. In this example, the slopes of the power profile respectively correspond to the types of optical fibers. Specifically, the slope G of the power profile is expressed by formula (4), where CD [ps/nm/km] and LOS [dB/km] are respectively the dispersion coefficient and the transmission loss of an optical fiber.

$$G = \frac{LOS}{CD} \quad (4)$$

For example, when the dispersion coefficient and the transmission loss of an SMF are respectively 17 ps/nm/km and 0.3 dB/km, the slope of the power profile of the SMF is dB/(ps/nm). When the dispersion coefficient and the transmission loss of a NZ-DSF are respectively 4.5 ps/nm/km and 0.3 dB/km, the slope of the power profile of the NZ-DSF is 0.067 dB/(ps/nm).

Accordingly, the connection order determination unit 24e can determine the fiber type of each section by calculating the slopes of the first and second sections depicted in FIG. 24B. Specifically, when the slope G1 is close to 0.018 dB/(ps/nm), it is estimated that the optical fiber installed in the first section is an SMF. When the slope G2 is close to 0.067 dB/(ps/nm), it is estimated that the optical fiber installed in the second section is a NZ-DSF. Note that a slope of the power profile may be calculated by, for example, differentiating the power profile with respect to a dispersion amount.

Figure 26:
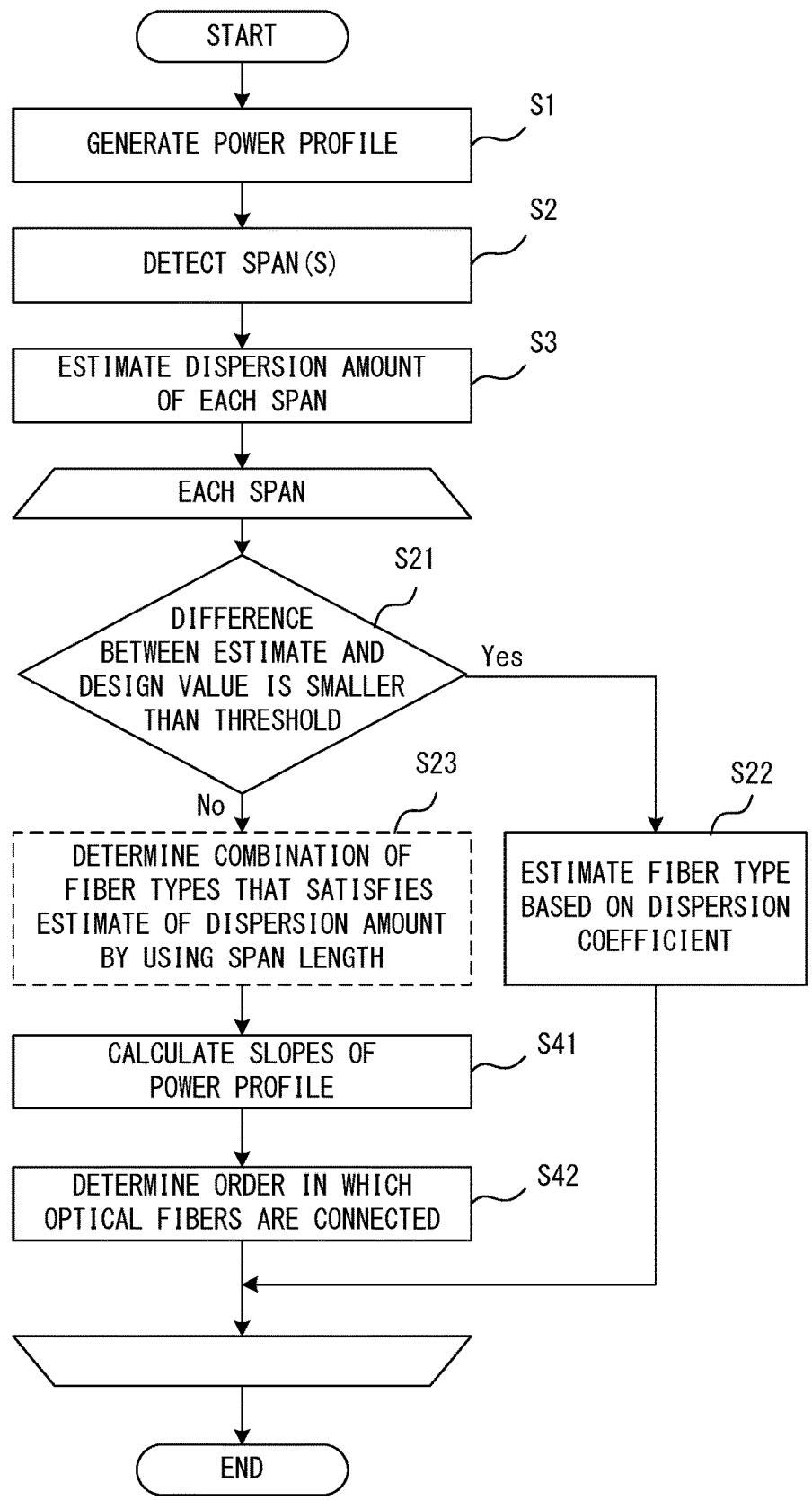
FIG. 26 is a flowchart illustrating processes performed by the fiber type estimation device in accordance with the fifth embodiment.

FIG. 26 is a flowchart illustrating processes performed by the fiber type estimation device 20 in accordance with the fifth embodiment. S1-S3 in FIG. 26 are the same as those in FIG. 12. Thus, the fiber type estimation device 20 calculates the dispersion amount of each span. Meanwhile, S21-S23 in FIG. 26 are the same as those in FIG. 18. Thus, the fiber type estimation device 20 estimates the type and the length of an optical fiber in an objective span.

In S41, the characteristics detector 24d calculates slopes of the power profile in the objective span. In S42, the connection order determination unit 24e determines, based on the fiber types estimated in S23 and the slopes of the power profile calculated in S41, an order in which the optical fibers are connected in the objective span.

In the flowchart depicted in FIG. 26, S41-S42 are performed after a combination of fiber types is determined in S23; however, the fiber type estimator 24 does not necessarily need to perform S23. In particular, when the dispersion coefficient and the transmission loss of each fiber type are known, as described above by referring to FIG. 24B, the fiber type estimator 24 can estimate, based only on the power profile, the type and the length of each of the optical fibers forming the objective span and the order in which the optical fibers are connected.

In the above-described examples in which slopes of the power profile in an objective span are calculated, the characteristics detector 24d may detect other characteristics. For example, when the combination detector 24b depicted in FIG. 22 has detected a combination of optical fibers in an objective span, the order in which the optical fibers are connected can be determined based on the shape of a power profile.

Sixth Embodiment

In the above-described examples, fiber types are estimated on the assumption that SMFs or NZ-DSFs may be installed in an optical fiber transmission line. In this regard, the dispersion coefficients of an SMF and a NZ-DSF are largely different from each other, so the SMF and the NZ-DSF can be accurately identified based on a power profile. In other words, when the dispersion coefficients of optical fibers are approximate to each other, it will not be easy to specify fiber types based on a power profile. For example, known NZ-DSFs have dispersion coefficients slightly different from each other (hereinafter, NZ-DSF1 and NZ-DSF2). The NZ-DSF1 and the NZ-DSF2 cannot be easily identified simply by generating a power profile for an optical fiber transmission line.

Figure 27:
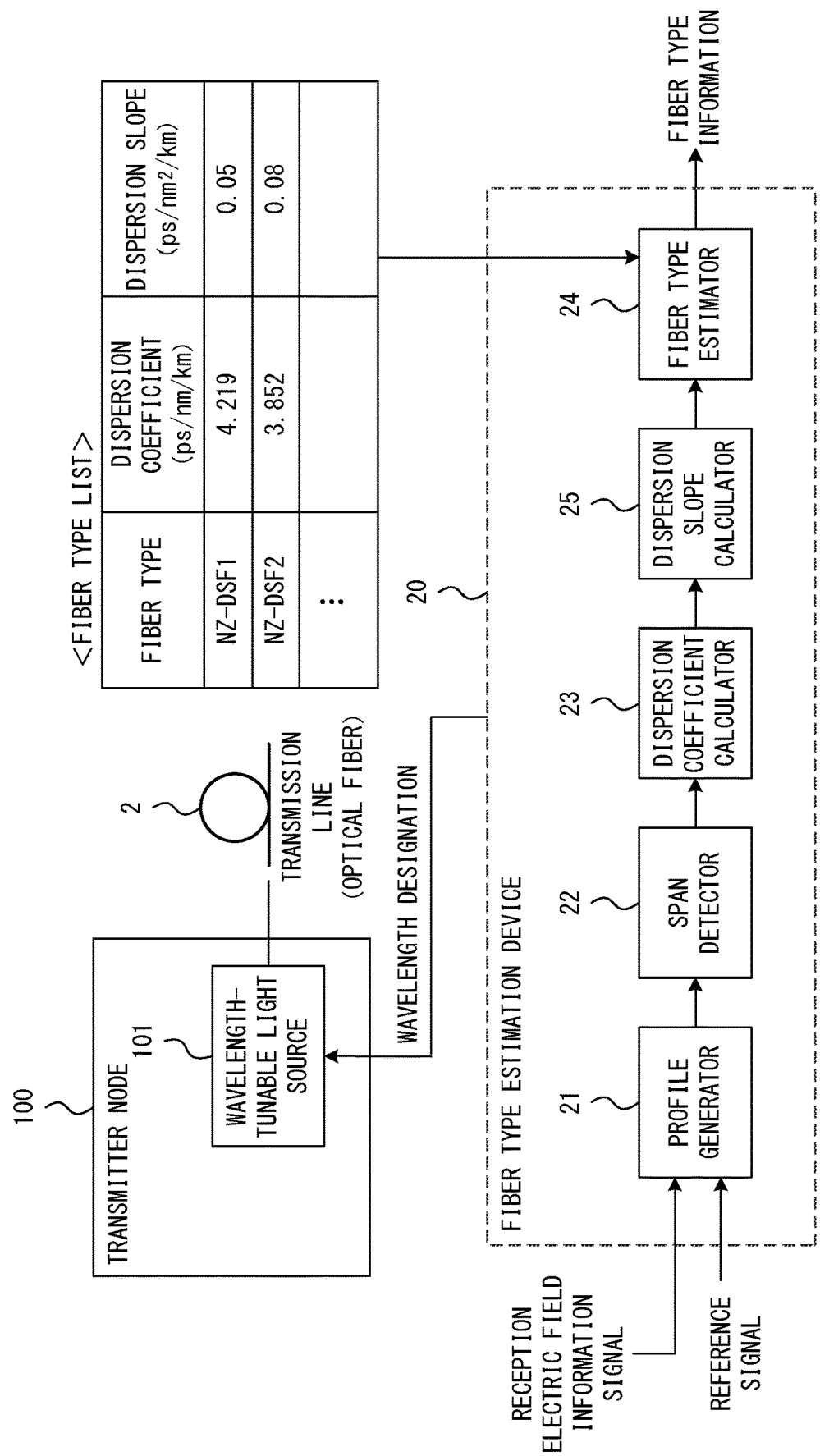
FIG. 27 illustrates an example of an optical transmission system in accordance with a sixth embodiment.

FIG. 27 illustrates an optical transmission system in accordance with the sixth embodiment. In this example, a transmitter node 100 includes a wavelength-tunable light source 101. The wavelength-tunable light source 101 can generate test light of a corresponding wavelength in accordance with a wavelength designation provided from the fiber type estimation device 20. Hence, the fiber type estimation device 20 can receive test light of a desired wavelength from the transmitter node 100. Note that the wavelength-tunable light source 101 can be implemented by, for example, an ASE light source and a wavelength selective switch (WSS).

The fiber type estimation device 20 includes a profile generator 21, a span detector 22, a dispersion coefficient calculator 23, a fiber type estimator 24, and a dispersion slope calculator 25. The fiber type estimation device 20 transmits a wavelength designation to the transmitter node 100. The wavelength designation designates a wavelength for test light. Thus, when the wavelength designation designates $\lambda 1$, the transmitter node 100 transmits test light of wavelength $\lambda 1$, and when the wavelength designation designates $\lambda 2$, the transmitter node 100 transmits test light of wavelength $\lambda 2$.

The profile generator 21 generates a power profile for each wavelength of test light. For each wavelength of test light, the dispersion coefficient calculator 23 calculates the dispersion coefficient of each span by using the power profile. The dispersion slope calculator 25 calculates the dispersion slopes of the respective spans by using the dispersion coefficients acquired from the dispersion coefficient calculator 23. The fiber type estimator 24 estimates the types of the optical fibers installed in the respective spans base on the dispersion coefficients and the dispersion slopes.

Figures 28A, 28B:
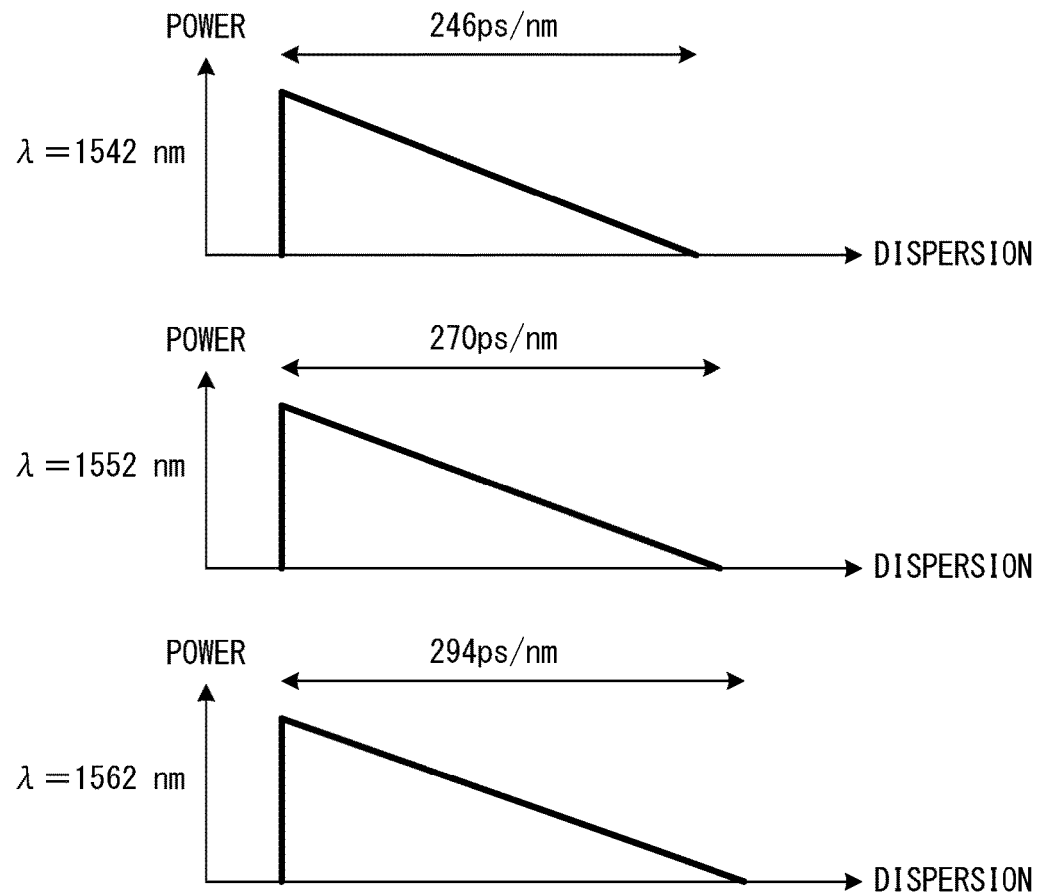
FIGS. 28A and 28B illustrate an example of measurement results obtained in the sixth embodiment.

FIGS. 28A and 28B illustrate an example of measurement results obtained in the sixth embodiment. FIG. 28A indicates power profiles generated for an objective span with respect to wavelengths. FIG. 28B indicates dispersion coefficients calculated based on the power profiles depicted in FIG. 28A. Note that the span length of the objective span is 60 km.

In the example indicated in FIGS. 28A and 28B, power profiles are generated with respect to three wavelengths. The dispersion coefficient calculator 23 calculates a dispersion coefficient for each of the wavelengths. When the wavelength of test light $\lambda 1$ is 1542 nm, the dispersion amount of the objective span is 246 ps/nm, and the dispersion coefficient of the objective span is 4.0 ps/nm/km. When the wavelength of test light $\lambda 2$ is 1552 nm, the dispersion amount of the objective span is 270 ps/nm, and the dispersion coefficient of the objective span is 4.5 ps/nm/km. When the wavelength of test light $\lambda 3$ is 1562 nm, the dispersion amount of the objective span is 300 ps/nm, and the dispersion coefficient of the objective span is 5.0 ps/nm/km.

The dispersion slope calculator 25 calculates a dispersion slope of the objective span. For example, the difference between the dispersion coefficients obtained for test light $\lambda 1$ and test light $\lambda 2$ is 0.5 ps/nm/km, and the wavelength difference between test light $\lambda 1$ and test light $\lambda 2$ is 10 nm. Thus, the dispersion slope obtained for test light $\lambda 1$ and test light $\lambda 2$ is 0.05 ps/nm$^2$/km.

The fiber type estimator 24 estimates the type of an optical fiber installed in the objective span base on the dispersion coefficients and the dispersion slopes of the objective span. In this case, the fiber type estimator 24 refers to a fiber type list prepared in advance. As depicted in FIG. 27, the fiber type list indicates a dispersion coefficient and a dispersion slope for each fiber type. Note that the dispersion coefficient and the dispersion slope of each fiber type are known values.

In this example, the dispersion coefficient is 4-5 ps/nm/km, so it is estimated that the optical fiber installed in the objective span is a NZ-DSF1. However, with an error taken into consideration, the optical fiber installed in the objective span may possibly be a NZ-DSF2. Thus, the fiber type estimator 24 considers the dispersion slope in addition to the dispersion coefficient. Accordingly, since the dispersion slope is 0.05, it is estimated that the optical fiber installed in the objective span is a NZ-DSF1 (not a NZ-DSF2).

Figure 29:
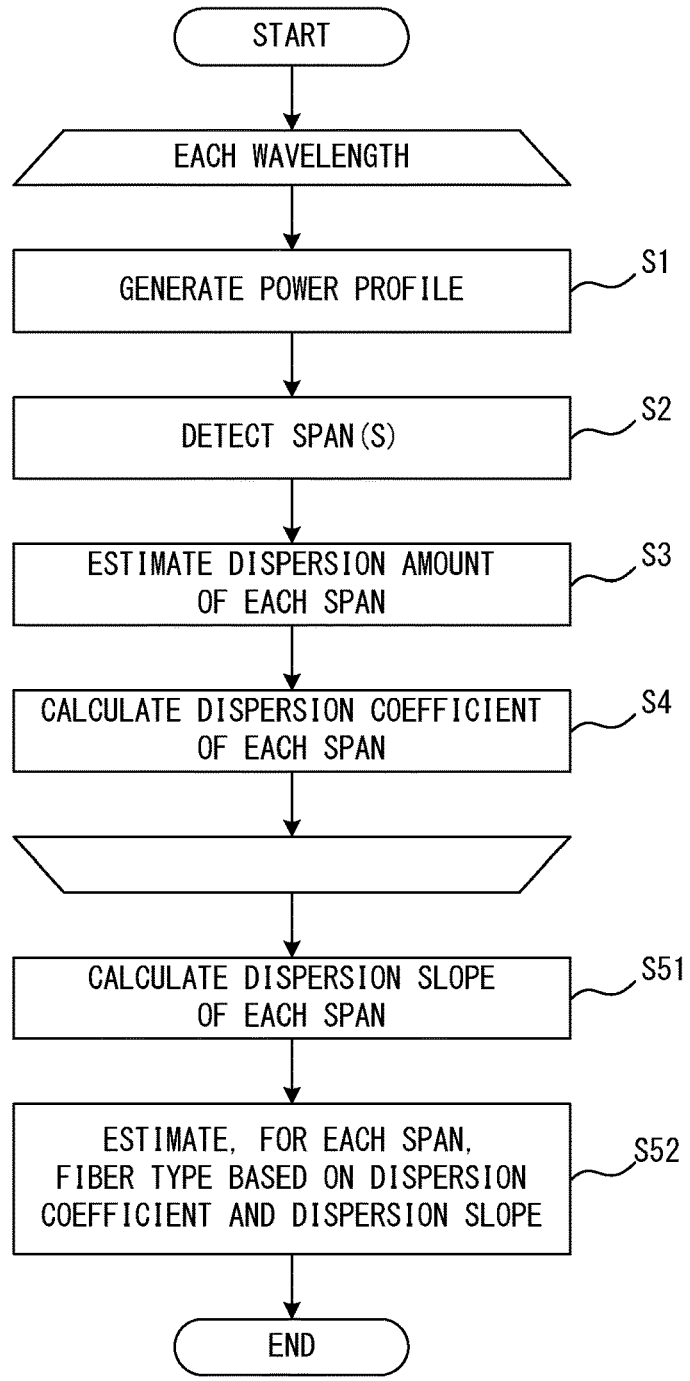
FIG. 29 is a flowchart illustrating processes performed by a fiber type estimation device in accordance with the sixth embodiment.

FIG. 29 is a flowchart illustrating processes performed by the fiber type estimation device 20 in accordance with the sixth embodiment. S1-S4 in FIG. 29 are the same as those in FIG. 12. Thus, the fiber type estimation device 20 calculates the dispersion coefficient of each span. However, in the sixth embodiment, the processes of S1-S4 are performed for each of a plurality of wavelengths. That is, a dispersion coefficient is calculated for each of the plurality of wavelengths.

In S51, the dispersion slope calculator 25 calculates a dispersion slope of each span. In S52, the fiber type estimator 24 estimates, for each span, a fiber type based on the dispersion coefficient and the dispersion slope.

As described above, in the sixth embodiment, fiber types are estimated using dispersion coefficients and dispersion slopes obtained based on power profiles. Hence, optical fibers having dispersion coefficients approximate to each other can be identified.

Seventh Embodiment

Figure 30:
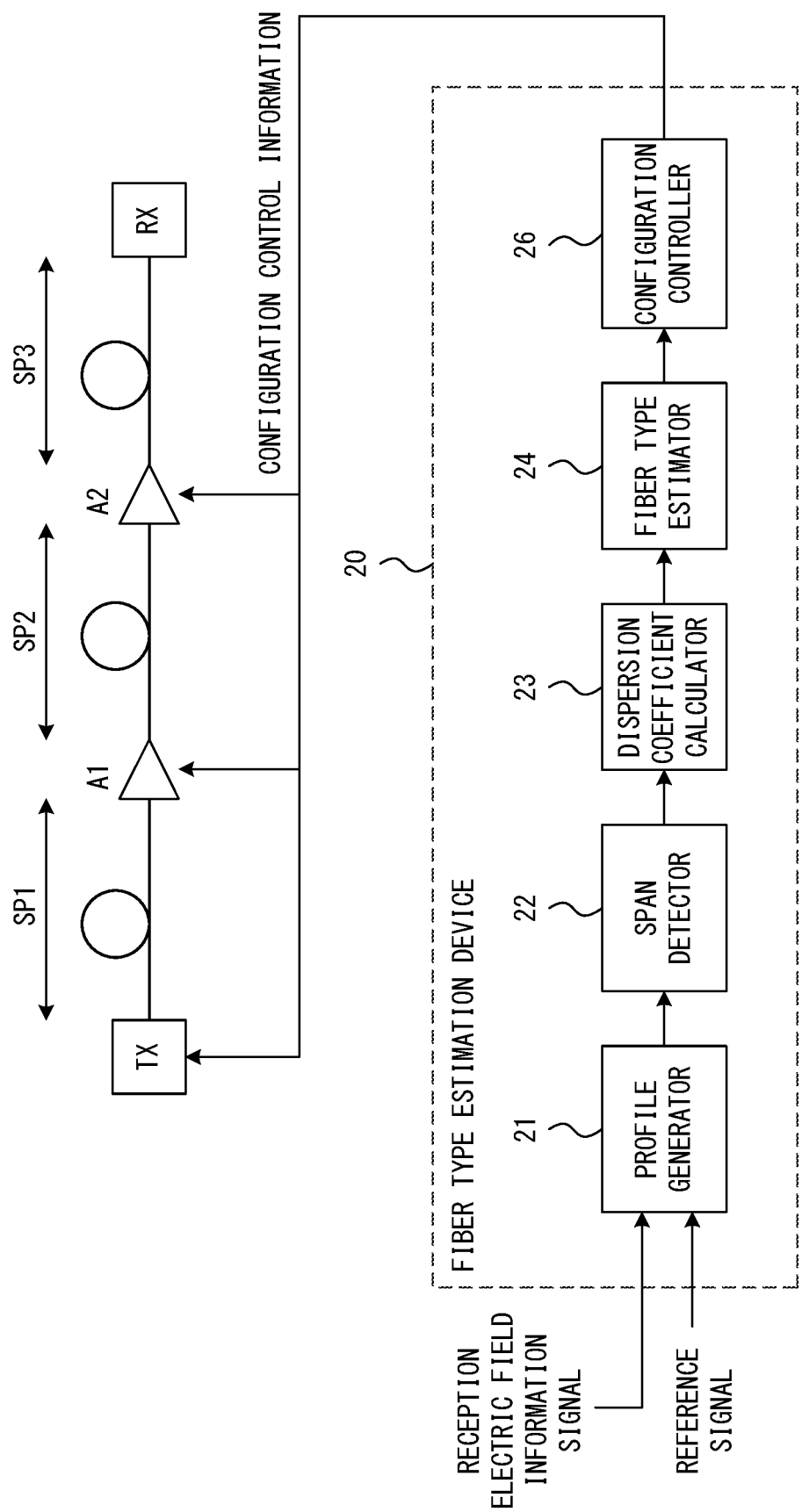
FIG. 30 illustrates an optical transmission system in accordance with a seventh embodiment.

FIG. 30 illustrates an optical transmission system in accordance with the seventh embodiment. In this example, an optical signal is transmitted from the transmitter node TX to the receiver node RX via the relay stations A1 and A2. Each node (transmitter node TX, relay station A1, relay station A2) controls the transmission power of the optical signal in accordance with design information. For example, the transmitter node TX may transmit the optical signal with power corresponding to the fiber type of the span SP1 (i.e., the type of the optical fiber between the transmitter node TX and the relay station A1).

Accordingly, an optical signal will be transmitted with inappropriate power if an optical fiber that is incorrect with respect to design information is installed. Transmitting an optical signal with inappropriate power will worsen an OSNR (optical signal-to-noise ratio) or a GSNR (generalized signal-to-noise ratio). Thus, in the seventh embodiment, the transmission power of each node is controlled in accordance with a fiber type estimated by the fiber type estimation device 20.

The fiber type estimation device 20 includes a configuration controller 26 in addition to the profile generator 21, the span detector 22, the dispersion coefficient calculator 23, and the fiber type estimator 24. In accordance with a fiber type estimated by the fiber type estimator 24, the configuration controller 26 generates configuration control information for controlling transmission power. The configuration controller 26 transmits the generated configuration control information to a corresponding node. For example, if a span with an estimated fiber type that is inconsistent with design information is detected, the configuration controller 26 may transmit configuration control information to a node on the source side of the span. Note that the configuration controller 26 may be implemented in the fiber type estimation device 20 or may be provided outside the fiber type estimation device 20.

Assume, as an example, that design information indicates that the span SP2 is formed from an SMF. In this case, the relay station A1 transmits an optical signal with power suitable for the SMF by controlling the gain of an optical amplifier implemented in the relay station A1. In this regard, assume that the fiber type estimation device 20 estimates that the optical fiber installed in the span SP2 is a NZ-DSF. In this case, the configuration controller 26 transmits configuration control information indicating power suitable for the NZ-DSF to the relay station A1. Thus, the relay station A1 transmits the optical signal with power suitable for the NZ-DSF. As a result, the OSNR or the GSNR improves.

Figure 31:
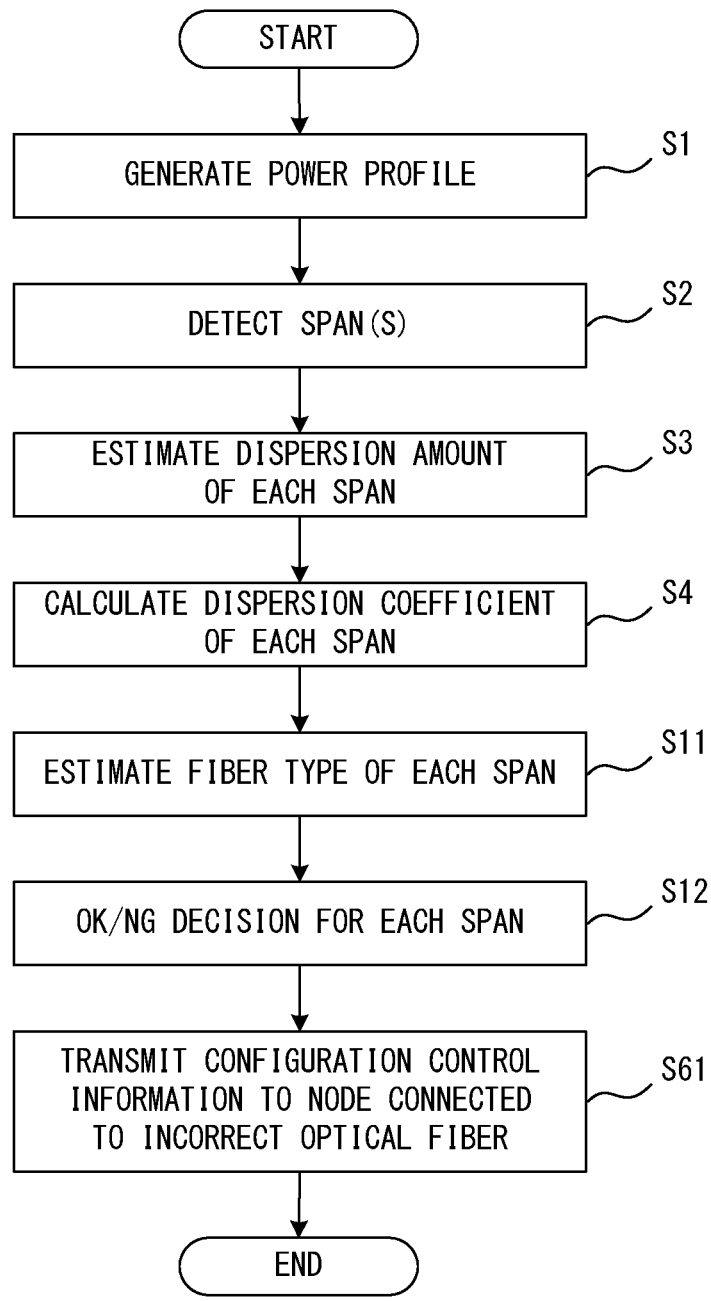
FIG. 31 is a flowchart illustrating processes performed by a fiber type estimation device in accordance with the seventh embodiment.

FIG. 31 is a flowchart illustrating processes performed by the fiber type estimation device 20 in accordance with the seventh embodiment. S1-S4 in FIG. 31 are the same as those in FIG. 12. Thus, the fiber type estimation device 20 calculates the dispersion coefficient of each span. S11-S12 in FIG. 31 are the same as those in FIG. 14. Thus, the fiber type estimation device 20 may detect a span in which an incorrect optical fiber has been installed by estimating the fiber type of each span. If a span in which an incorrect optical fiber has been installed is detected, the process of S61 is performed.

In S61, the configuration controller 26 transmits configuration control information to an optical node connected to the incorrect optical fiber (i.e., optical node on the source side of the span in which the incorrect optical fiber has been installed). The configuration control information indicates transmission power suitable for the estimated fiber type. The optical node that has received the configuration control information controls transmission optical power by adjusting the gain of the optical amplifier in accordance with the configuration control information.

In the example indicated in FIG. 31, the configuration controller 26 generates configuration control information based on a fiber type estimated by the fiber type estimator 24. However, the present invention is not limited to this configuration. For example, the configuration controller 26 may generate configuration control information based on a dispersion coefficient calculated by the dispersion coefficient calculator 23. All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A characteristics estimation device that estimates characteristics of an optical fiber transmission line in an optical transmission system in which an optical signal is transmitted from a first node to a second node via the optical fiber transmission line, the characteristics estimation device comprising:
    a span detector that detects one or more spans forming the optical fiber transmission line by using a power profile, the power profile indicating a relationship between power of the optical signal and a dispersion amount corresponding to a transmission distance from the first node or the second node;
    a coefficient calculator that calculates, for each detected span, a dispersion coefficient of the optical fiber transmission line by dividing a dispersion amount estimated based on the power profile by a corresponding span length; and
    an estimator that estimates, for each detected span, a type of an optical fiber forming the optical fiber transmission line based on the calculated dispersion coefficient.

2. The characteristics estimation device according to claim 1, wherein
    the coefficient calculator estimates the dispersion amount of each detected span by using the power profile,
    when a first span among the one or more detected spans is formed from a plurality of optical fibers, the estimator
        acquires fiber data indicating a known dispersion coefficient for each of a plurality of types of the plurality of optical fibers, and
        estimates a type and a fiber length of each optical fiber by comparing a sum of the fiber lengths of the plurality of optical fibers with a span length of the first span and by comparing a dispersion coefficient of each optical fiber with the dispersion coefficient indicated by the fiber data.

3. The characteristics estimation device according to claim 1, wherein
    the coefficient calculator estimates the dispersion amount of each detected span by using the power profile, when a first span among the one or more detected spans is formed from a plurality of optical fibers, the estimator acquires fiber data indicating a known dispersion coefficient for each of a plurality of types of the plurality of optical fibers, and estimates a type and a fiber length of each optical fiber by using the fiber data, such that a sum of the fiber lengths of each of the plurality of optical fibers matches a span length of the first span and such that a sum of products of the fiber lengths of each of the plurality of optical fibers and corresponding dispersion coefficients matches a dispersion amount of the first span.

4. The characteristics estimation device according to claim 3, wherein the estimator acquires connection point information indicating a position of a connection point between the plurality of optical fibers in the first span, and specifies, based on the connection point information, an order in which the plurality of optical fibers are connected.

5. The characteristics estimation device according to claim 3, wherein the estimator specifies, based on a characteristic of a shape of the power profile in the first span, an order in which the plurality of optical fibers are connected.

6. The characteristics estimation device according to claim 1, further comprising a generator that generates the power profile for each of a plurality of wavelengths, wherein the coefficient calculator calculates a dispersion coefficient of each detected span for each of the plurality of wavelengths by using a corresponding power profile, and for each detected span, the estimator estimates, based on a slope of the dispersion coefficient with respect to a wavelength, the type of the optical fiber forming the optical fiber transmission line.

7. The characteristics estimation device according to claim 1, further comprising a controller that generates configuration control information designating transmission power for the optical signal based on the calculated dispersion coefficient for an objective span among the one or more detected spans or based on the estimated fiber type for the objective span, and transmits the configuration control information to an optical node located on a transmission side of the objective span.

8. The characteristics estimation device according to claim 6, wherein the generator includes:

a first compensator that compensates for, in an electric field information signal indicating an electric field of the optical signal received by the second node via the optical fiber transmission line, a first dispersion among dispersions of the optical fiber transmission line, a second compensator that compensates for, in an output signal of the first compensator, a nonlinear distortion of the optical fiber transmission line, a third compensator that compensates for, in an output signal of the second compensator, a remaining dispersion among the dispersions of the optical fiber transmission line, and a calculator that calculates an optical power corresponding to a combination of the first dispersion and the remaining dispersion based on an output signal of the third compensator, and the generator, while varying an amount of the first dispersion, calculates corresponding optical powers, so as to calculate optical powers corresponding to a plurality of dispersion amounts.

9. The characteristics estimation device according to claim 8, wherein calculator calculates the optical power corresponding to the combination of the first dispersion and the remaining dispersion based on a correlation between a reference signal indicating an electric field of the optical signal at the first node and the output signal of the third compensator.

10. An optical transmission system comprising:

a first optical transmission device;

a second optical transmission device that receives an optical signal transmitted from the first optical transmission device via an optical fiber transmission line; and a characteristics estimation device that estimates a characteristic of the optical fiber transmission line, wherein the characteristics estimation device includes;

a span detector that detects one or more spans forming the optical fiber transmission line by using a power profile, the power profile indicating a relationship between power of the optical signal and a dispersion amount corresponding to a transmission distance from a first node or a second node via the optical fiber transmission line;

a coefficient calculator that calculates, for each detected span, a dispersion coefficient of the optical fiber transmission line by dividing a dispersion amount estimated based on the power profile by a corresponding span length; and an estimator that estimates, for each detected span, a type of an optical fiber forming the optical fiber transmission line based on the calculated dispersion coefficient.

11. A characteristics estimation method for estimating characteristics of an optical fiber transmission line in an optical transmission system in which an optical signal is transmitted from a first node to a second node via the optical fiber transmission line, the characteristics estimation method comprising:

detecting one or more spans forming the optical fiber transmission line by using a power profile, the power profile indicating a relationship between power of the optical signal and a dispersion amount corresponding to a transmission distance from the first node or the second node;

calculating, for each detected span, a dispersion coefficient of the optical fiber transmission line by dividing a dispersion amount estimated based on the power profile by a corresponding span length; and estimating, for each detected span, a type of an optical fiber forming the optical fiber transmission line based on the calculated dispersion coefficient.

* * * * *